(12) United States Patent
Matsuoka et al.

(10) Patent No.: US 9,183,605 B2
(45) Date of Patent: Nov. 10, 2015

(54) IMAGE PROJECTING APPARATUS, IMAGE PROCESSING METHOD, AND COMPUTER-READABLE STORAGE MEDIUM

(71) Applicants: Taira Matsuoka, Kanagawa (JP); Yoshihiro Inukai, Kanagawa (JP); Taro Kikuchi, Tokyo (JP); Akira Murakata, Tokyo (JP); Naofumi Yoshimizu, Saitama (JP)

(72) Inventors: Taira Matsuoka, Kanagawa (JP); Yoshihiro Inukai, Kanagawa (JP); Taro Kikuchi, Tokyo (JP); Akira Murakata, Tokyo (JP); Naofumi Yoshimizu, Saitama (JP)

(73) Assignee: Ricoh Company, Limited, Tokyo (JP)

(*) Notice: Subject to any disclaimer, the term of this patent is extended or adjusted under 35 U.S.C. 154(b) by 321 days.

(21) Appl. No.: 13/719,276

(22) Filed: Dec. 19, 2012

(65) Prior Publication Data

US 2013/0162688 A1  Jun. 27, 2013

(30) Foreign Application Priority Data

Dec. 21, 2011 (JP) ................. 2011-280485
Nov. 26, 2012 (JP) ................. 2012-257327

(51) Int. Cl.
*G09G 5/00* (2006.01)
*G06T 1/00* (2006.01)
*G06T 11/60* (2006.01)
*H04N 9/31* (2006.01)
*G06F 3/14* (2006.01)
*G09G 3/00* (2006.01)
*G09G 5/02* (2006.01)

(52) U.S. Cl.
CPC ............... *G06T 1/00* (2013.01); *G06F 3/1415* (2013.01); *G06T 11/60* (2013.01); *G09G 3/002* (2013.01); *G09G 5/026* (2013.01); *H04N 9/3188* (2013.01); *H04N 9/3194* (2013.01); *G09G 2330/021* (2013.01); *G09G 2340/12* (2013.01); *G09G 2360/145* (2013.01)

(58) Field of Classification Search
None
See application file for complete search history.

(56) References Cited

U.S. PATENT DOCUMENTS

| 6,727,909 | B1* | 4/2004 | Matsumura et al. .......... 345/629 |
| 2005/0128054 | A1 | 6/2005 | Glickman |
| 2006/0061809 | A1 | 3/2006 | Murataka et al. |
| 2007/0064267 | A1 | 3/2007 | Murakata et al. |
| 2007/0097435 | A1* | 5/2007 | Terajima ................ 358/1.16 |

(Continued)

FOREIGN PATENT DOCUMENTS

| CN | 101263546 A | 9/2008 |
| JP | 2007-116306 | 5/2007 |

(Continued)

OTHER PUBLICATIONS

Office Action for corresponding Chinese application No. 2012105571700 dated Jun. 3, 2015 and English Translation thereof.

*Primary Examiner* — Yingchun He
(74) *Attorney, Agent, or Firm* — Harness, Dickey & Pierce, P.L.C.

(57) ABSTRACT

An image projecting apparatus includes an image projecting unit configured to project received original image data on an image projection surface; an area identifying unit configured to identify an obstruction area in which different content is displayed as compared to a normal projection surface to be projected based on the original image data; and a layout modifying unit configured to modify a layout of an object included in the original image data that is projected, on the basis of the object and the obstruction area on the image projection surface.

14 Claims, 22 Drawing Sheets

(56) References Cited

U.S. PATENT DOCUMENTS

| | | | |
|---|---|---|---|
| 2007/0274704 A1* | 11/2007 | Nakajima et al. | 396/310 |
| 2008/0056598 A1 | 3/2008 | Murakata | |
| 2010/0149206 A1* | 6/2010 | Shigehisa et al. | 345/595 |
| 2010/0321400 A1* | 12/2010 | Miyahara | 345/600 |
| 2011/0227951 A1* | 9/2011 | Kubo et al. | 345/667 |
| 2012/0120312 A1 | 5/2012 | Yamasaki et al. | |

FOREIGN PATENT DOCUMENTS

| | | |
|---|---|---|
| JP | 2008-235965 | 10/2008 |
| JP | 2009-071541 | 4/2009 |
| JP | 2010-050830 | 3/2010 |
| JP | 2010-146086 | 7/2010 |
| JP | 2010-268138 | 11/2010 |
| JP | 2011-030111 | 2/2011 |
| JP | 2011-077972 | 4/2011 |

* cited by examiner

FIG.4
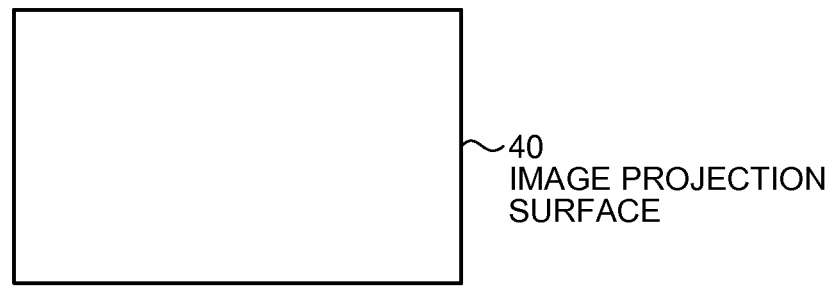
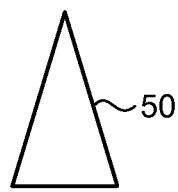
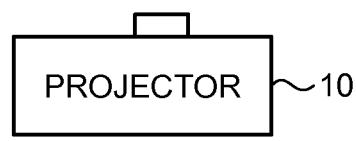
FIG.5
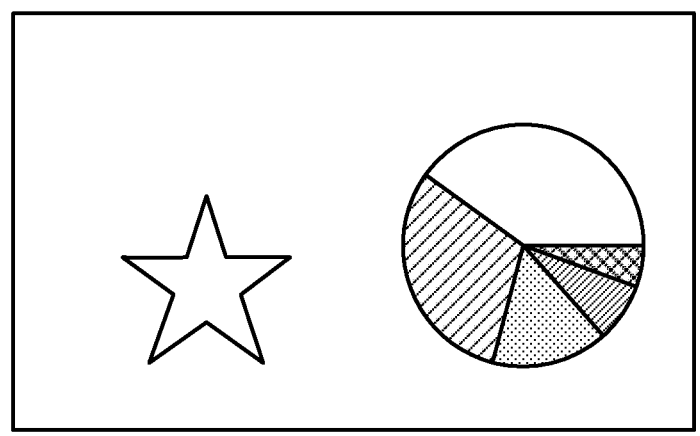

FIG.26

| LAYOUT DRAWING | (A) AMOUNT OF OVERLAP BETWEEN OBJECTS IN ORIGINAL IMAGE | (B) AMOUNT OF OVERLAP BETWEEN OBSTRUCTION AREAS AND OBJECTS | (C) MOVEMENT DISTANCE OF OBJECTS | TOTAL |
|---|---|---|---|---|
| (1) | 0 | 600000 | 0 | 600000 |
| (2) | 40000 | 340000 | 10000 | 390000 |
| (3) | 0 | 340000 | 16400 | 356400 |
| (4) | 60000 | 0 | 46400 | 106400 |
| (5) | 70000 | 120000 | 40000 | 230000 |
| (6) | 30000 | 120000 | 50000 | 200000 |
| (7) | 30000 | 360000 | 60000 | 450000 |
| (8) | 0 | 0 | 622500 | 622500 |
| (9) | 10000 | 0 | 65600 | 75600 |

FIG.27

| LAYOUT DRAWING | OBJECT a | OBJECT b | OBJECT c | OBJECT d |
|---|---|---|---|---|
| (1) | 0 | 0 | 0 | 0 |
| (2) | 100 | 0 | 0 | 0 |
| (3) | 100 | 80 | 0 | 0 |
| (4) | 200 | 80 | 0 | 0 |
| (5) | 200 | 0 | 0 | 0 |
| (6) | 200 | 0 | 100 | 0 |
| (7) | 200 | 0 | 100 | 100 |
| (8) | 450 | 500 | 100 | 400 |
| (9) | 200 | 160 | 0 | 0 |

(BACKGROUND: LEFT END - WHITE, RIGHT END - GREEN)

(BACKGROUND: LEFT END - WHITE,
RIGHT END - GREEN)

(BACKGROUND: LEFT END - WHITE,
RIGHT END - GREEN)

FIG.42
(a)
(b)
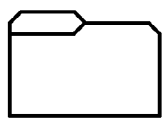
(c)
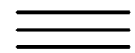
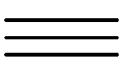
(d)
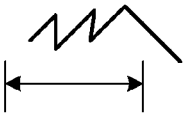

FIG.43
(a) 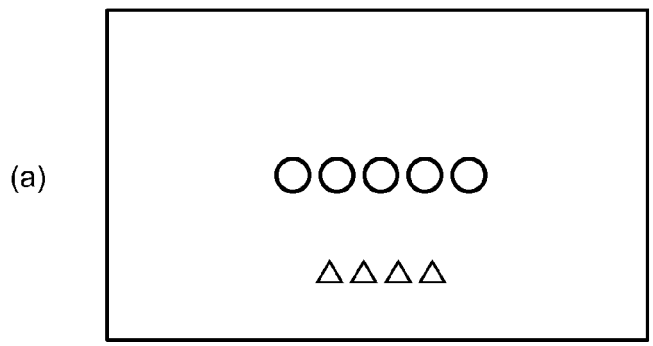
(b) 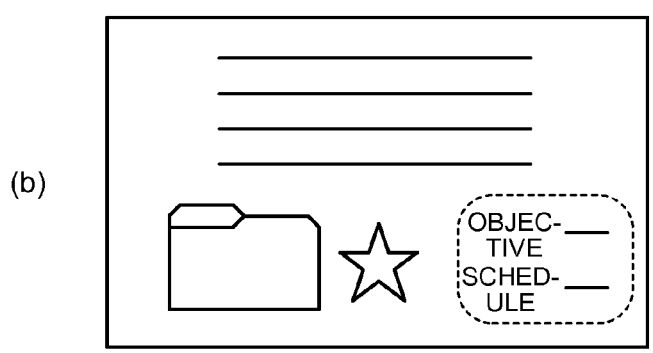
(c) 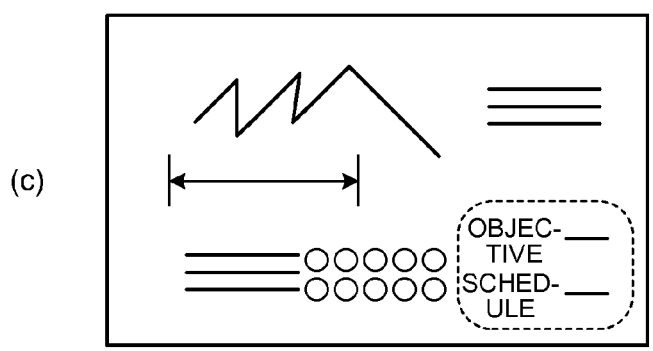
(d) 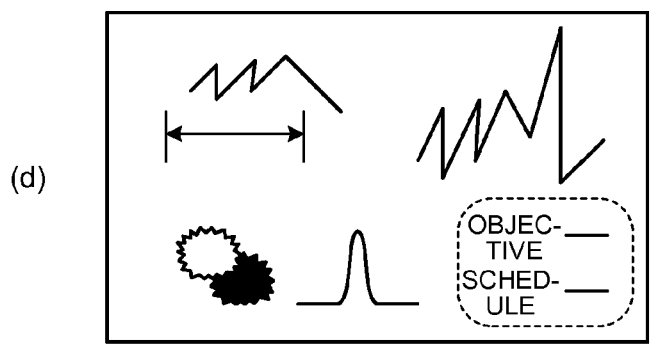

IMAGE PROJECTING APPARATUS, IMAGE PROCESSING METHOD, AND COMPUTER-READABLE STORAGE MEDIUM

CROSS-REFERENCE TO RELATED APPLICATIONS

The present application claims priority to and incorporates by reference the entire contents of Japanese Patent Application No. 2011-280485 filed in Japan on Dec. 21, 2011 and Japanese Patent Application No. 2012-257327 filed in Japan on Nov. 26, 2012.

BACKGROUND OF THE INVENTION

1. Field of the Invention

The present invention relates to an image projecting apparatus, an image processing method, and a computer-readable storage medium.

2. Description of the Related Art

With the advent of multimedization in recent years, projectors are being used in various situations as image projecting apparatuses that are capable of projecting images on large screens. For example, while giving presentations during company meetings, projectors capable of projecting images of various information materials are being increasingly used.

Consider a case in which, while a projector is projecting an image on a whiteboard, one wants to write down some new content on the whiteboard by hand. In that case, if the projector is projecting the image over the entire whiteboard, then sometimes there is no space to write anything down by hand. In that regard, a technology has been disclosed that allows specification of an area in which content can be written by hand, and the specified area is secured either by not displaying an image portion of the specified area or by displaying a thumbnail of that image portion on the outside of the specified area (for example, Japanese Patent Application Laid-open No. 2010-146086).

However, in a typical projector that enables securing of an area for handwriting, because of the fact that the area for handwriting is secured on the projection surface on which an image is projected by the projector, either some portion of the image projected by the projector is not displayed or the entire projected image is displayed in a scaled-down form. That results in a decline in the visibility. As a result, it may not be possible to correctly convey the information that the person who prepared the information material wishes to communicate.

Therefore, there is a need for an image projecting apparatus, an image processing method, and a computer-readable storage medium that make it possible to correctly convey the information that a user wishes to communicate using projected images.

SUMMARY OF THE INVENTION

It is an object of the present invention to at least partially solve the problems in the conventional technology.

According to an embodiment, there is provided an image projecting apparatus that includes an image projecting unit configured to project received original image data on an image projection surface; an area identifying unit configured to identify an obstruction area in which different content is displayed as compared to a normal projection surface to be projected based on the original image data; and a layout modifying unit configured to modify a layout of an object included in the original image data that is projected, on the basis of the object and the obstruction area on the image projection surface.

According to another embodiment, there is provided an image processing method that includes identifying an obstruction area in which different content is displayed on an image projection surface as compared to a normal projection surface to be projected based on the original image data; and modifying a layout of an object included in the original image data that is projected, on the basis of the object and the obstruction area on the image projection surface.

According to still another embodiment, there is provided a non-transitory computer-readable storage medium with an executable program stored thereon. The program instructs a computer to perform identifying an obstruction area in which different content is displayed on an image projection surface as compared to a normal projection surface to be projected based on the original image data; and modifying a layout of an object included in the original image data that is projected, on the basis of the object and the obstruction area on the image projection surface.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 4 to 7 are diagrams for explaining a mechanism implemented for recognizing an obstruction area by an area identifying unit illustrated in FIG. 3;

FIG. 26 illustrates, in a tabular form, exemplary evaluation scores of evaluation items (A) to (C) in each layout drawing from FIG. 17 to FIG. 25;

FIG. 27 illustrates, in a tabular form, the movement distance of each object in each layout drawing from FIG. 17 to FIG. 25;

FIGS. 42 and 43 are diagrams illustrating examples of application in a presentation that has a plurality of continuous pages;

DETAILED DESCRIPTION OF THE PREFERRED EMBODIMENT

Exemplary embodiments of the present invention are described in detail below with reference to the accompanying drawings.

Image Projecting System

Figure 1:
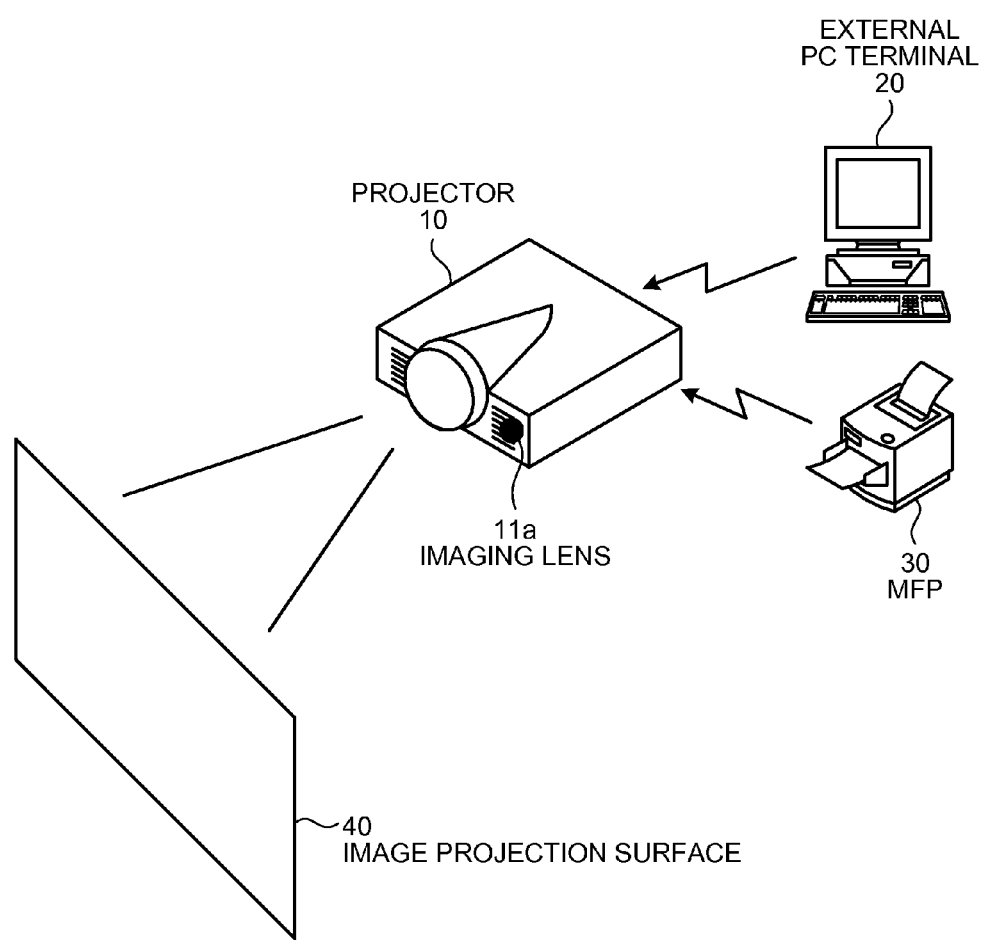
FIG. 1 illustrates an image projecting system that includes a projector according to an embodiment.

FIG. 1 illustrates an image projecting system that includes a projector functioning as an image projecting apparatus according to an embodiment.

In the image projecting system illustrated in FIG. 1, a projector 10 receives input of image data from an external PC terminal 20 or a multifunction printer (MFP) 30. The external PC terminal 20 is a commonly-used personal computer that is capable of transferring image data to the projector 10 via a network.

The MFP 30 includes a scanner functioning as an image reading device; and is capable of reading an original, performing image processing that is suitable for outputting an image on a paper (i.e., image processing that enables authentic reproduction of an original image on a transfer paper), and outputting the copy image. Moreover, the MFP 30 is capable of performing image processing suitable for displaying an image that has been read, converting that image into an image format such as JPEG, and delivering the JPEG image to an external device such as the projector 10 via a network interface controller (NIC).

With respect to the image data (the original image data) input thereto, the projector 10 performs predetermined image processing for image projection and projects images on an image projection surface 40. The projector 10 has an imaging function for capturing images of the image projection surface 40 with the use of an imaging lens 11a that is disposed on the front face of the main body of the projector 10. As the image projection surface 40, the users who desire for projected images having high image quality use a screen designed exclusively for image projection. However, if high image quality is not required; then, in an office or the like, it is often the case that either a wall surface having white color or a pale pastel color in a meeting room is used instead of the image projection surface 40, or a whiteboard serves as the image projection surface 40.

Internal Configuration of Projector

Figure 2:
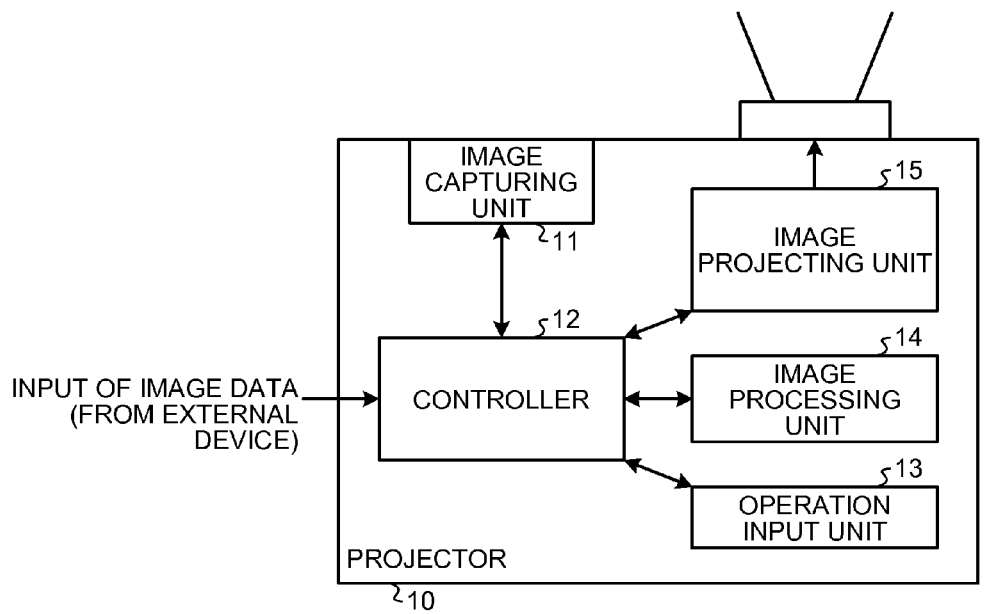
FIG. 2 is a block diagram illustrating an internal configuration of the projector illustrated in FIG. 1.

Explained below with reference to FIG. 2 is an internal configuration of the projector 10.

The projector 10 has a built-in image capturing unit 11, which includes the imaging lens 11a illustrated in FIG. 1. With that, the projector 10 can capture and incorporate the image being projected on the image projection surface 40. Then, by comparing the image data of the captured image with the original image data that is projected by the projector 10, it becomes possible to confirm whether or not the image being projected on the image projection surface 40 is in accordance with the original image data. In case the image is not projected in accordance with the original image, then it becomes possible to recognize the area on the image projection surface 40 that is different as compared to the original image.

A controller 12 performs control of each constituent element of the projector 10, and obtains user instructions via an operation input unit 13. That is, via the operation input unit 13, a user is allowed to issue instructions about execution/termination of projection using the projector 10; switching ON/switching OFF of an illumination light source; and projection modes such as a normal mode, an energy saving mode, or a color universal design (CUD) mode. In the energy saving mode, the power consumption of the illumination light source is held down, and projection is performed with a reduced light intensity. In the CUD mode, an image processing unit 14 performs color processing in such a way that, even if a presentation is given using full-color images, a partially color-blind person watching the presentation is able to understand the content. Meanwhile, the controller 12 sends the data of projected images, which is incorporated by the image capturing unit 11, or the image data received from an external device to the image processing unit 14; and receives the result of processing performed with respect to the sent data. The details of the image processing unit 14 are given later.

An image projecting unit 15 includes a light source device; an illumination optical system for emitting an illumination light; a color separation optical system that performs color separation of the illumination optical system into light of three colors of red (R), green (G), and blue (B); three liquid crystal panels on which the illumination light split in three colors falls; a synthetic optical system that synthesizes image light of all colors which has passed through the liquid crystals; and a projection optical system that projects synthetic image light on the image projection surface 40. Each optical system includes a plurality of lens arrays, a prism, and a dichroic mirror; and reduces the aberration generated therein as much as possible.

In the projector 10 that is configured in the manner described above, the image data received from an external device is input to the image processing unit 14 via the controller 12. Then, the image processing unit 14 corrects the image data for the purpose of image projection and sends the corrected image data to the image projecting unit 15. Subsequently, the image projecting unit 15 projects the image data toward the image projection surface 40.

Figure 3:
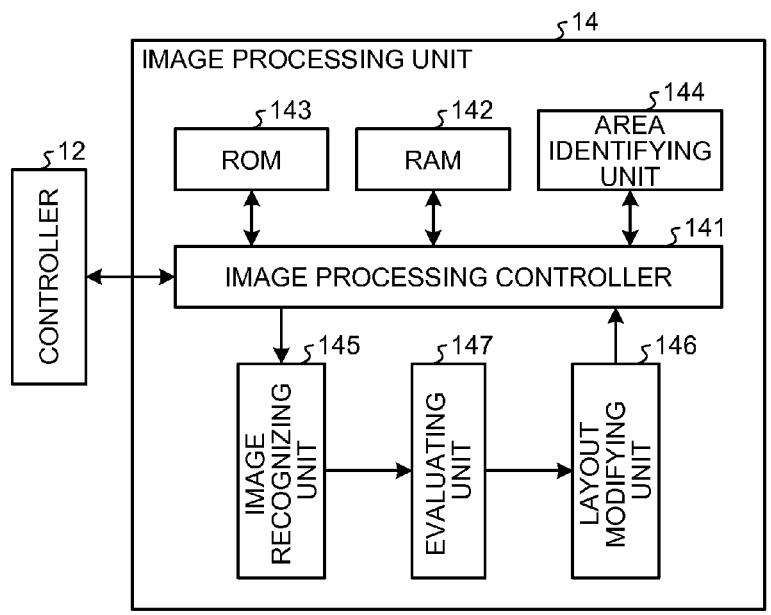
FIG. 3 is a block diagram illustrating a configuration of an image processing unit 14 illustrated in FIG. 2.
Figure 6:
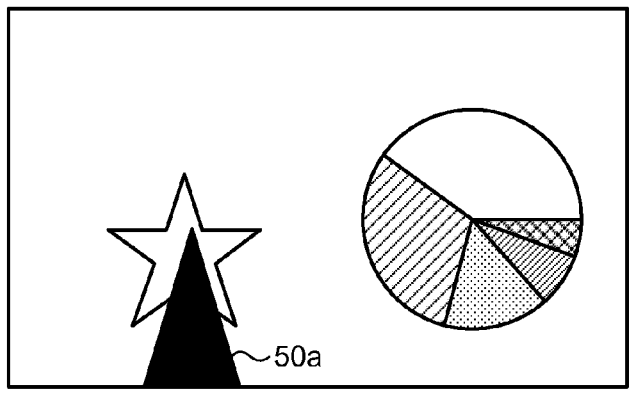

Configuration of Image Processing Unit FIG. 3 illustrates a configuration of the image processing unit 14, which functions as an image processing apparatus. As illustrated in FIG. 3, the image processing unit 14 includes an image processing controller 141, a read only memory (ROM) 143, a random access memory (RAM) 142, an area identifying unit (an obstruction detecting unit) 144, an image recognizing unit 145, an evaluating unit 147, and a layout modifying unit (an image processing unit) 146.

The image processing controller 141 performs communication with the controller 12. Moreover, the image processing controller 141 obtains images that are sent from the image capturing unit 11 and that are meant for the image projection surface 40; obtains image data that is input from outside; and loads the image data in the memory space of the RAM 142 as may be necessary. Meanwhile, computer programs executed by the image processing controller 141 as well as the necessary parameters for the execution of those computer programs are stored in the ROM 143 or a computer-readable storage medium.

The area identifying unit 144 recognizes, as an "obstruction area", an area in which falls the shadow of a foreign object (obstruction) present in between the projector 10 and the image projection surface 40 or an area of handwritten characters (writing area) that are written on a whiteboard serving as the image projection surface 40. More particularly, the area identifying unit 144 compares the image data that is incorporated by the image capturing unit 11 and that is meant for the image projection surface 40 with the original image data (herein, the original image data that has been subjected to image processing for image projection), and recognizes the differing portions as obstruction areas. As far as considering handwritten characters to be an obstruction area is concerned, a predetermined area around the handwritten characters is treated as the obstruction area. However, that is not the only possible case.

The image recognizing unit 145 recognizes the attributes, positions, and sizes of objects such as text objects or graphic objects in the image data received from an external PC or the like.

Based on an obstruction area identified on the image projection surface 40 and based on an object present in the original image data that is projected; the evaluating unit 147 obtains an evaluation value that indicates the relationship of the obstruction area with the position of the object in the original image data. More particularly, when an object moves to a plurality of different positions in the original image data, the evaluating unit 147 obtains the evaluation value with respect to each position of the object. The processes performed by the evaluating unit 147 are described later in detail.

The layout modifying unit 146 communicates with the area identifying unit 144 and the image recognizing unit 145; and performs image processing such as changing the sharpness or the color shades of the input image, modifying the layout of objects in the original image, and enlarging/reducing the original image as may be necessary. The layout modifying unit 146 modifies the layout by moving the objects in the original image data based on a plurality of evaluation values. The layout modification is not limited to moving the objects in the original image data based on a plurality of evaluation values. The layout modifying unit 146 may be configured to modify the layout based on the obstruction area on the image projection surface and the objects included in the projected original image data without using such an evaluation value.

Recognition of Obstruction Area

Explained below with reference to FIGS. 4 to 7 is the mechanism implemented by the area identifying unit 144 for recognizing an obstruction area using the image projected by the projector 10 and the image data of the image projection surface 40 obtained by the image capturing unit 11. For example, as illustrated in FIG. 4, assume that a triangular obstruction is present in between the projector 10 and the image projection surface 40.

Consider a case when an image illustrated in FIG. 5 is projected from the projector 10. In that case, an obstruction 50 illustrated in FIG. 4 blocks the light from reaching the image projection surface 40. As a result, a shadow of the obstruction 50 falls on the image projection surface 40. Consequently, as the image data of the image projection surface 40, the image capturing unit 11 obtains image data illustrated in FIG. 6. If there is no obstruction, then the image capturing unit 11 obtains image data equivalent to the image data illustrated in FIG. 5. The area identifying unit 144 compares the original image data projected from the projector 10 with the image data obtained by the image capturing unit 11. Then, regarding an image area having a difference equal to or more than a predetermined amount (i.e., regarding the portion referred to by a reference numeral 50a in FIG. 6), the area identifying unit 144 determines that an obstruction is present.

Figure 7:
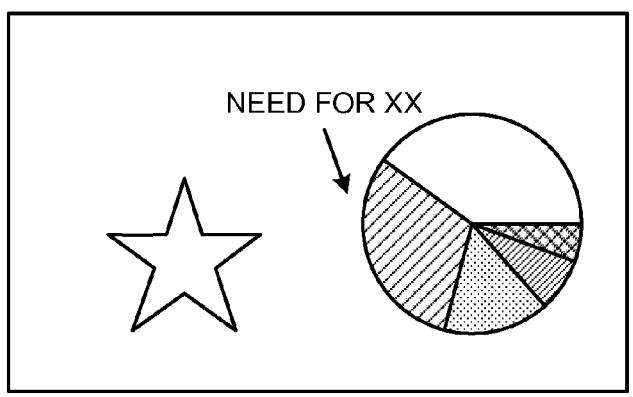

Meanwhile, if a whiteboard is used as the image projection surface 40; then there are times when discussion is held on the basis of the projected images, and the content of the discussion is directly written down on the image projection surface 40. FIG. 7 illustrates an example of that situation. In this case, "need for XX" that is written down newly is not present in the example illustrated in FIG. 5. Thus, according to the embodiment, such additional characters are also considered to represent an "obstruction area". That is, an "obstruction area" points to an area regarding which there is a difference in the original image and the image that is actually projected on a screen.

Processing of Projected Images

Given below is the explanation regarding specific processing of projected images performed in a conventional case and explanation regarding specific processing of projected images performed according to the embodiment. FIGS. 8 to 14 are diagrams for explaining the processing of projected images.

Figure 8:
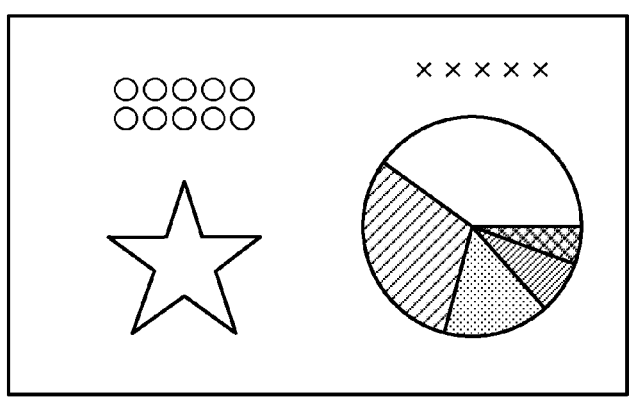
FIGS. 8 to 14 are diagrams for explaining the processing of projected images.
Figure 9:
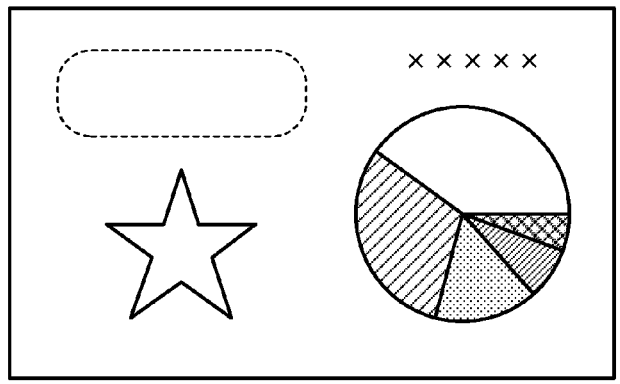

FIG. 8 illustrates an image that corresponds to image data input from an external device. In the initial state, the image data is projected from the projector 10. In the following explanation, it is assumed that a whiteboard serves as the image projection surface 40. On the whiteboard, it is possible to write using a board marker.

Generally, during a meeting, while holding a discussion related to the presentation material; there are times when the content of the discussion is written down on the whiteboard, so that the content is shared with all participants. In that case, sometimes the projection from the projector 10 is temporarily stopped. At that time, in case the light source is switched OFF, then it takes time for the light source to cool down before being able to restart. Alternatively, sometimes, the light projection opening of the projector 10 is simply blocked using a notebook or the like. However, it is not a safe option because the notebook gets hot. Besides, even though the discussion is to be held regarding the projected information materials, it becomes difficult to advance the discussion if the projected images are not displayed.

In that regard, there has been proposed a conventional technology in which only some area of the image projection surface 40 is not exposed to the projected light from the projector 10, so that it becomes possible to perform writing in that area. Herein, that particular area can be specified either by using a touch-sensitive panel or by directly specifying the coordinates from the operation input unit 13. Hereinafter, that area is sometimes referred to as "writing area".

Figure 10:
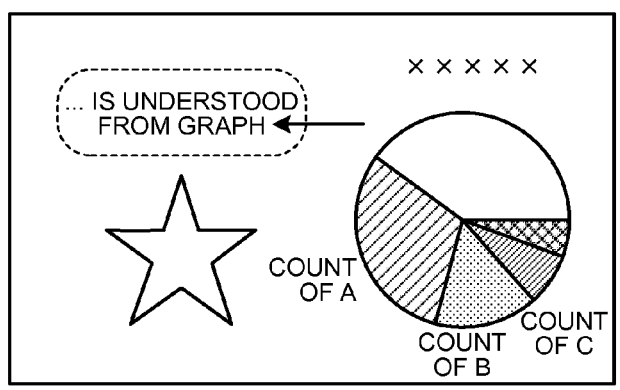
Figure 11:
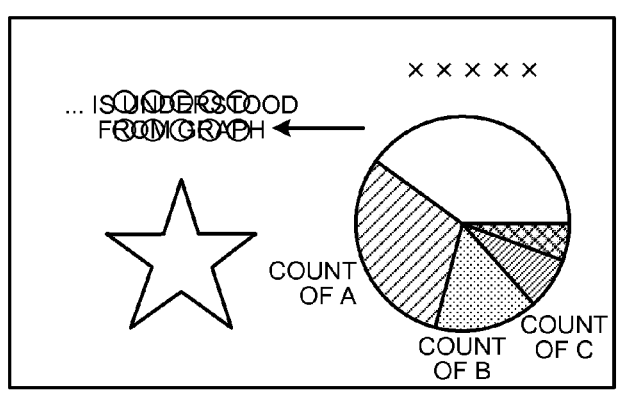

Consider a case of projecting a presentation material illustrated in FIG. 8. In that case, if the conventional technology (such as Japanese Patent Application Laid-open No. 2010-146086) is implemented; then, regarding an area enclosed by a dashed line illustrated in FIG. 9, the light projected from the projector 10 is blocked from reaching that enclosed area. In FIG. 10 (as well as in FIG. 11 to FIG. 14), a character string and an arrow are written on the whiteboard using a board marker. FIG. 11 illustrates a state obtained when presentation is resumed in the state illustrated in FIG. 10, and the light is projected over the entire image projection surface 40 by ending the temporary stoppage of light to some area. In the top left area illustrated in FIG. 11, the projected image in the initial state illustrated in FIG. 8 (i.e., the image called "original image" that is formed according to the image data for projection received from the external PC terminal 20 or the like) overlaps with the writing area. That makes it extremely difficult to read the information. Hence, instead of causing the originally-presented information in the presentation to disappear as is the case in the conventional technology, it is desirable to ensure that the discussion can be advanced while the originally-presented information as well as the written information is displayed on the image projection surface.

First Embodiment

Figure 12:
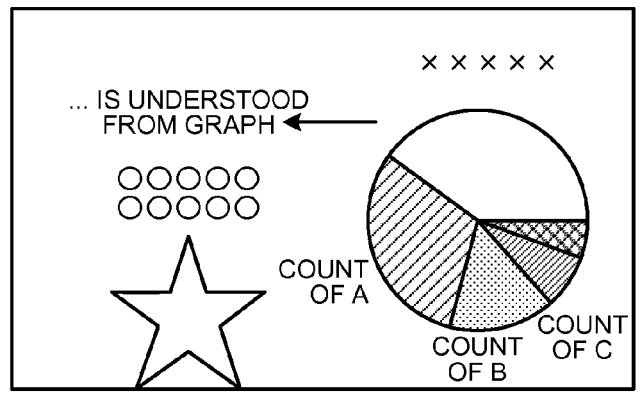
Figure 13:
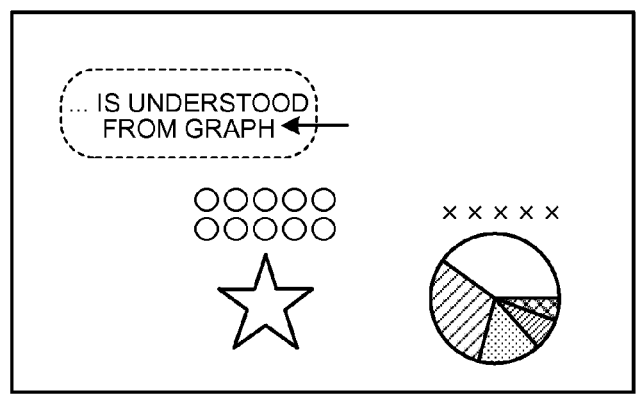

In that regard, in a first embodiment, as illustrated in FIG. 12, the objects included in the original image are moved with the aim of avoiding overlapping with a writing area. Alternatively, as illustrated in FIG. 13, the original image is projected after scaling it down to an extent of avoiding overlapping with the writing area. Such image processing is performed by the layout modifying unit 146.

Figure 14:
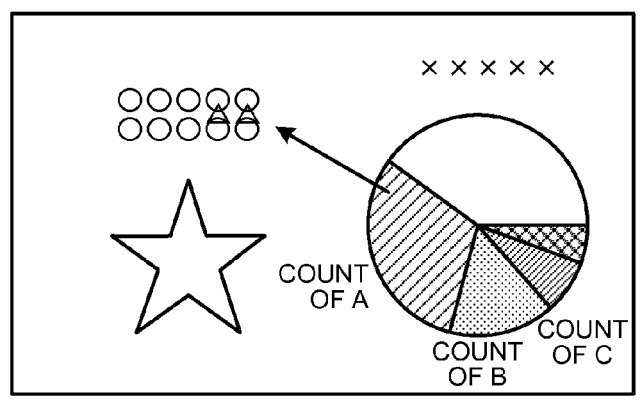

Meanwhile, in a case when "xxx" is written on the whiteboard as illustrated in FIG. 14, the overlapping area is not big. Hence, it is not much difficult to read the information. In such a case, there is no need to modify the layout particularly of the image for presentation (original image). That is, the layout modifying unit 146 obtains the amount of overlap between an obstruction area and the objects present in the original image data. Then, if the amount of overlap is equal to or greater than a predetermined threshold value, the layout modifying unit 146 modifies the layout of the objects. On the other hand, if the amount of overlap is smaller than the predetermined threshold value, the layout modifying unit 146 does not modify the layout of the objects.

Generally, a presentation has the layout which is thought to be best suited by the person who created that presentation. Hence, unless it is necessary, the layout should not be processed in the projector 10. In the case of modifying the layout of objects, in order to avoid a considerable deviation from the idea of the person who created the presentation, it is ensured that the distance of moving the objects is as small as possible. If the original image is scaled down and displayed as illustrated in FIG. 13, then the relative position relationship between the objects can be maintained. However, since the original image is scaled down in entirety, it affects the visibility. When the objects contain characters, the decrease in the character font size makes it highly likely that the meeting participants viewing the presentation from a long distance cannot recognize the characters. In that regard, candidates for layout modification are projected for selection from the projector 10. Then, once the candidate for layout modification is selected by the user via the operation input unit 13, the corresponding image data is projected.

Figure 15:
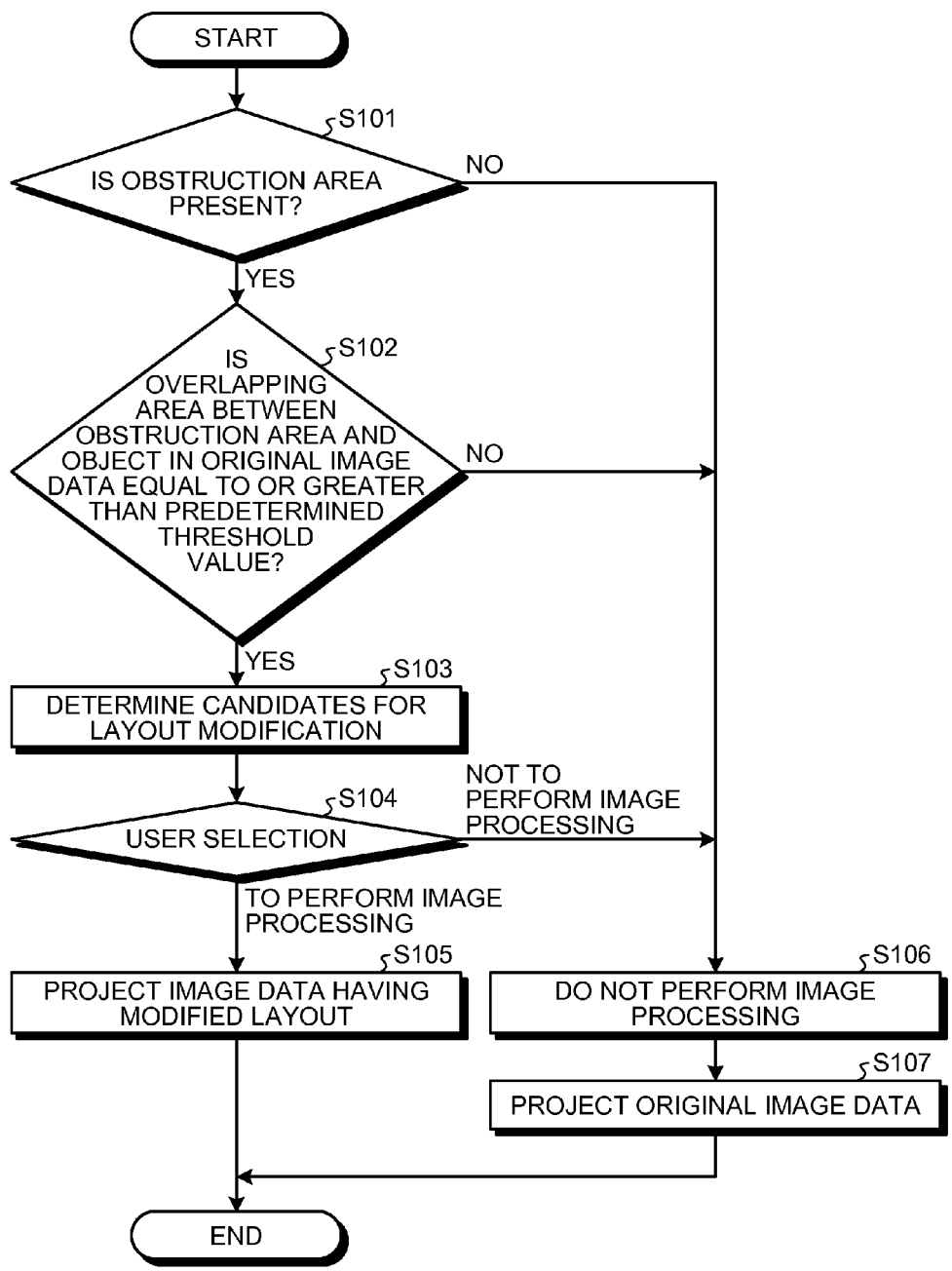
FIG. 15 is a flowchart for explaining a sequence of control processes performed in the projector.

The explanation given above can be illustrated as a flow of processes illustrated in FIG. 15. Thus, FIG. 15 is a flowchart for explaining a sequence of control processes performed in the projector 10.

Herein, the processes illustrated in FIG. 15 are performed at the timing at which the user presses a predetermined hardware key, or at the timing at which the user projects a screen menu and selects a menu item indicating execution of the layout modification process. However, these timings are only exemplary, and the processes illustrated in FIG. 15 can be performed at any arbitrary timing.

With reference to FIG. 15, firstly, the image processing controller 141 refers to an obstruction area recognition result of the area identifying unit 144 and determines whether or not any obstruction area is present (Step S101). If it is determined that no obstruction area is present (No at Step S101), then the image processing (herein, layout modification) by the layout modifying unit 146 is not performed (Step S106). As a result, under the control of the controller 12, the original image data is projected without any modification in the layout (Step S107).

On the other hand, if it is determined that an obstruction area is present (Yes at Step S101), then the image processing controller 141 calculates the overlapping area between the obstruction area and the objects present in the original image data, and determines whether or not the overlapping area is equal to or greater than a predetermined threshold value.

If the overlapping area is not equal to or greater than a predetermined threshold value (No at Step S102), then the image processing (herein, layout modification) by the layout modifying unit 146 is not performed (Step S106). As a result, under the control of the controller 12, the original image data is projected without any modification in the layout (Step S107).

On the other hand, if the overlapping area is equal to or greater than a predetermined threshold value (Yes at Step S102), then the image processing controller 141 ensures that image processing by the layout modifying unit 146 is performed, and the layout modifying unit 146 determines the candidates for layout modification in a manner described later based on the information from the image recognizing unit 145 (Step S103).

Then, according to the user selection via the operation input unit 13 (Step S104); if it is indicated that image processing is not to be performed, the image processing controller 141 ensures that image processing (herein, layout modification) by the layout modifying unit 146 is not performed (Step S106). On the other hand, if any one of the candidates for layout modification is selected, then it is assumed that the image of the selected candidate for layout modification, that is, the image data having a modified layout is to be projected. As a result, under the control of the controller 12, the image data having a modified layout is projected (Step S105).

Meanwhile, as described above, when the image processing (herein, layout modification) by the layout modifying unit 146 is not to be performed (Step S106); then, under the control of the controller 12, the original image data is projected without any modification in the layout (Step S107).

Explained below are the details of layout modification performed by the layout modifying unit 146 with respect to the objects.

Regarding a candidate for layout modification; background areas in the original image are detected, and an object nearest to a large background area is moved in that background area. Herein, in an original image, a background area points to an area in which no object is present. By repeating the abovementioned process, objects keep on filling the background areas. Then, following evaluation items are evaluated: (A) amount of overlap between objects in the original image (more particularly, dimension (pixel count) of overlapping areas); (B) amount of overlap between obstruction areas and objects (more particularly, dimension (pixel count) of overlapping areas); and (C) movement distance of objects (more particularly, pixel count of the distance of movement). Herein, it can be said that, the smaller the evaluation values of all evaluation items, the more suitable becomes the layout modification.

More particularly, the evaluating unit 147 adds the evaluation score of the amount of overlap between objects (A), the evaluation score of the amount of overlap between obstruction areas and objects (B), and the evaluation score of the movement distance of objects during layout modification (C); and obtains the total evaluation score (overall evaluation score).

Meanwhile, the movement of objects is performed in the following manner. With respect to the objects present in the original image data, the layout modifying unit 146 selects an arbitrary direction from among the upward direction, the right upward direction, the rightward direction, the right downward direction, the downward direction, the left downward direction, the leftward direction, and the left upward direction from the current positions of those objects. Then, in the original image data, the layout modifying unit 146 moves the objects in the selected direction by a predetermined pixel count. Subsequently, with the layout having the objects moved to the new positions, the evaluating unit 147 obtains the evaluation scores of the evaluation items (A), (B), and (C); and calculates the total evaluation score as the overall evaluation score. Then, in a repeated manner, the layout modifying unit 146 moves the objects by a predetermined pixel count and the evaluating unit 147 calculates the overall evaluation score. Subsequently, the layout modifying unit 146 selects another direction and moves the objects in the selected direction by a predetermined pixel count in a repeated manner, and the evaluating unit 147 calculates the overall evaluation score in a repeated manner. This process is carried out with respect to each of the abovementioned directions.

Then, as candidates for layout modification, the layout modifying unit 146 determines images in which objects are moved to positions in the original image data that are within a predetermined range of evaluation scores. For example, of the candidates for layout modification, three layout plans in ascending order of the total of the three evaluation items are added to the candidates for layout modification. Moreover, as illustrated in FIG. 13, the scaled-down image in which the relative position relationship of all objects other than the writing area is maintained is also added to the candidates for layout modification. Meanwhile, the layout modifying unit 146 can be configured to determine images in which objects are moved to positions at which the evaluation scores are equal to or smaller than a predetermined value within a predetermined range of evaluation scores in the original image data.

Then, on the image projection surface 40, the image projecting unit 15 projects a plurality of candidates for layout modification that are determined by the layout modifying unit 146. Subsequently, the operation input unit 13 receives a user selection of the desired candidate for layout modification from among the candidates for layout modification projected on the image projection surface 40.

Meanwhile, in case the selection of a candidate for layout modification is a burdensome task, then the user can be allowed to set the priority among the evaluation item (A), the evaluation item (B), the evaluation item (C), and the entirely scaled-down display. Then, the display can be performed according to the priority.

Alternatively, instead of the user doing the selection, the layout modifying unit 146 can be configured to modify the layout to the candidate for layout modification having the smallest evaluation score.

Then, the layout modifying unit 146 modifies the layout of objects by moving the objects to the positions indicated in the selected candidate for layout modification.

Meanwhile, the layout modification performed in this manner can be achieved by running a presentation development application in the external PC terminal 20 and by manually rearranging all the objects. However, that method is extremely complex and causes suspension of the meeting for a long period of time. In contrast, if the projector 10 according to the embodiment is used, the discussion can be held smoothly without having to suspend the meeting too often. Besides, since the discussion can be held while referring to the necessary presentation material, it becomes easier to advance the discussion. Moreover, regarding the presentation material that is displayed, the visibility is maintained without affecting the condition of the presentation material in a major way.

Figure 16:
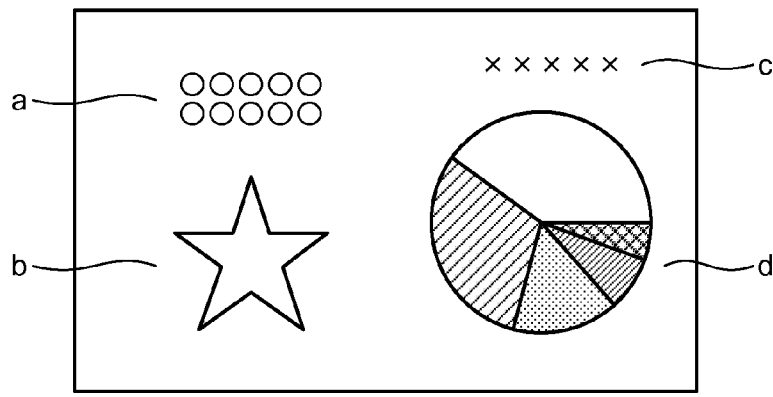
FIG. 16 is a diagram illustrating an example of presentation material (an original image)
Figure 17:
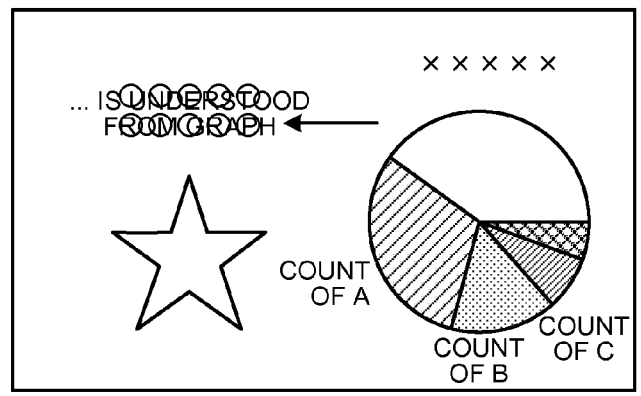
FIGS. 17 to 25 are layout drawings illustrated for a case when objects are moved little by little.
Figure 18:
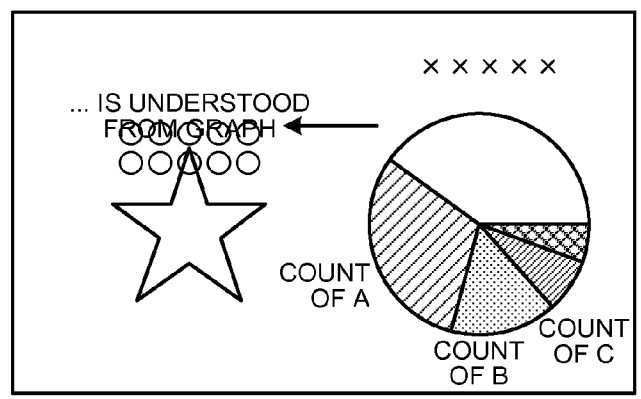
Figure 19:
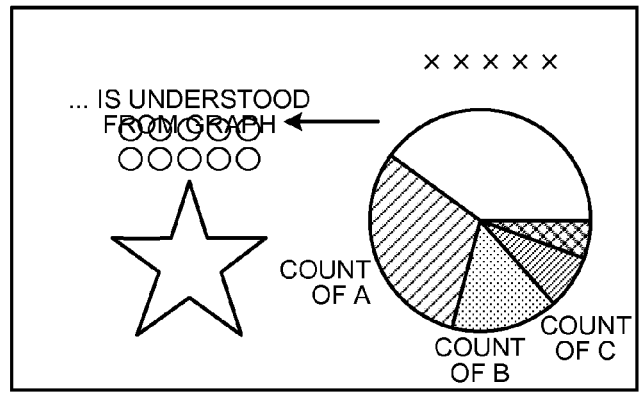
Figure 20:
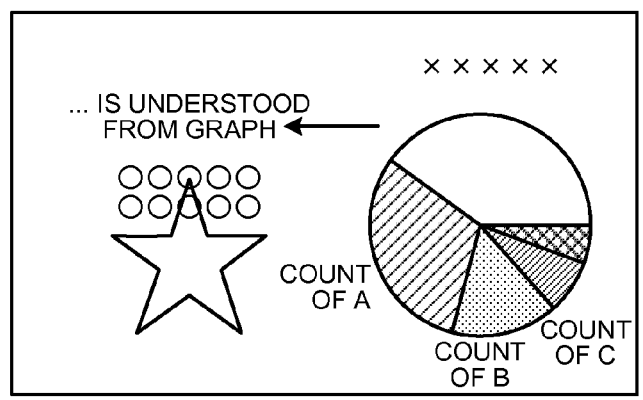
Figure 21:
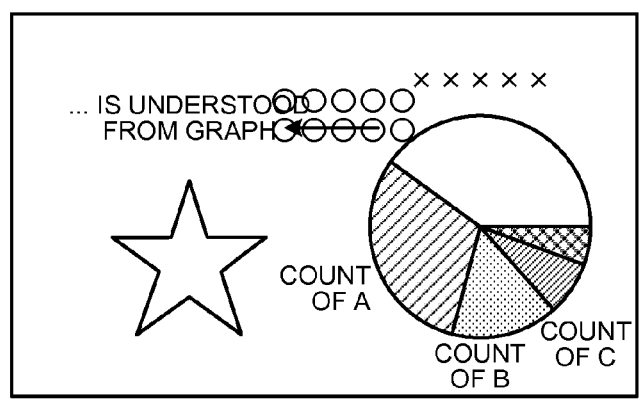

Explained below is a specific example of layout modification. In FIG. 11 in which the writing has been done, the obstruction area points to a top left area containing a character string. Herein, with reference to FIG. 16, the objects in the original image data include a character string (an object a) reading "yyy . . . " and denoted by "a"; a star sign (an object b) denoted by "b"; a character string (an object c) reading "zzz . . . " and denote by "c"; and a pie chart (an object d) denoted by "d".

FIGS. 17 to 25 are layout drawings illustrated for a case when objects are moved little by little with respect to the projection screen on which full-screen projection is done as well as the writing illustrated in FIG. 11 is done. In the following explanation, the layout drawings illustrated in FIGS. 17 to 25 are respectively referred to as a layout drawing (1) to a layout drawing (9). Herein, the objects are moved little by little in a repeated manner so that the background areas are filled by the objects. That is followed by the evaluation of evaluation items. FIG. 26 illustrates, in a tabular form, exemplary evaluation scores of the evaluation items (A) to (C) in each layout drawing from FIG. 17 to FIG. 25. Each of the evaluation items (A) and (B) indicates the dimension (pixel count) of overlapping areas; while the evaluation item (C) indicates the total of the movement distance (pixel count) of each object. However, since the area is the square of the movement distance; regarding the evaluation item (C), the sum of squares of the movement distance of each object is set as the movement distance of each object.

Figure 22:
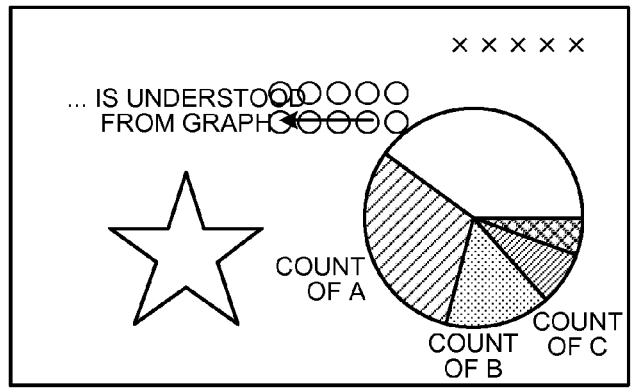
Figure 23:
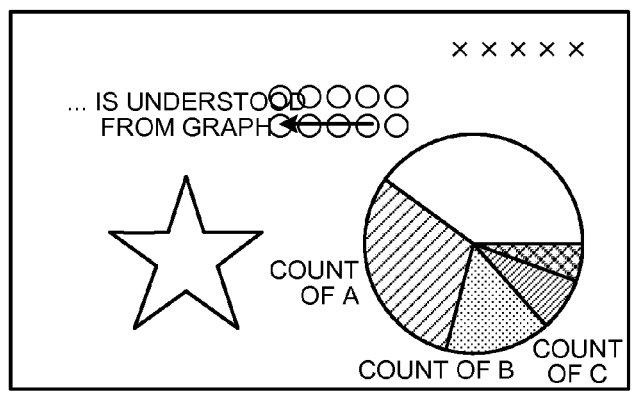

FIG. 27 illustrates, in a tabular form, the movement distance of each object. For example, in the case of FIG. (i.e., the layout drawing (6)), the object a is moved by 200 and the object c is moved by 100 as illustrated in FIG. 27. As a result, the evaluation score regarding the evaluation item (C) in FIG. 22 is equal to 200×200+100×100=50000.

Figure 25:
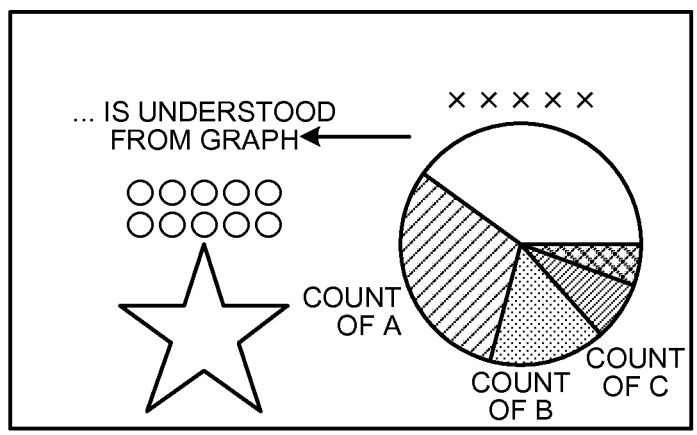

FIG. 25 (the layout drawing (9)) has the lowest evaluation score in the table illustrated in FIG. 26. Hence, FIG. 25 (the layout drawing (9)) becomes the leading candidate for layout movement. If three drawings having the lowest evaluation scores are to be considered as candidates for layout movement; then layout drawings (4), (6), and (9) become the candidates for layout movement. From those layout drawings, the user makes the final selection.

Figure 24:
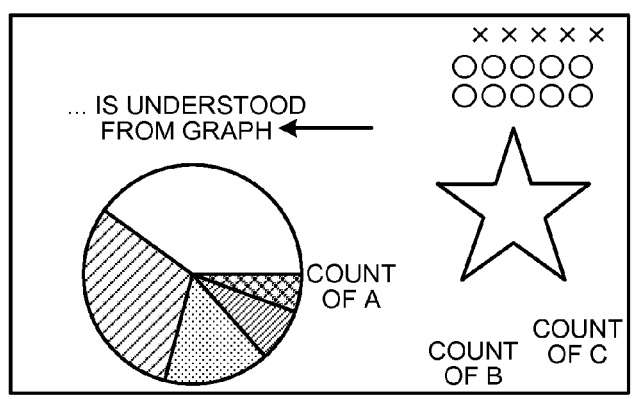

As in the case of FIG. 24 (the layout drawing (8)), even when there is no overlapping between objects or between an object and an obstruction area, there is a large amount of movement. Regarding an arrangement that is far different than the original arrangement, the evaluation score increases. Thus, it is difficult to consider such an arrangement as a candidate for layout movement.

Meanwhile, herein, the overall evaluation score is considered to be the simple addition of evaluation scores of the evaluation items (A) to (C). However, alternatively, the overall evaluation can be performed upon changing weights with respect to the evaluation items (A) to (C). That is, the evaluating unit 147 can be configured to obtain the evaluation score in the form of a value calculated by performing weighted addition of the evaluation score of the amount of overlap between objects (A), the evaluation score of the amount of overlap between obstruction areas and objects (B), and the movement distance of objects during layout modification (C). For example, when a candidate for layout modification needs to have a small movement distance; for example, the overall evaluation score can be obtained using the following calculating formula of performing weighted addition.

Overall evaluation score=(evaluation score of (A))+(evaluation score of (B))+2×(evaluation score of (C))

In the formula given above, although the weighting coefficient is "2", it is possible to use any arbitrary weighting coefficient. Meanwhile, although such evaluation requires a certain amount of time, the projector 10 can be made to read in advance the presentation material and to calculate in advance the evaluation scores.

Meanwhile, the evaluating unit 147 can also be configured to obtain the evaluation score based on at least one of the evaluation score of the amount of overlap between object (A), the evaluation score of the amount of overlap between obstruction areas and objects (B), and the movement distance of objects during layout modification (C).

In the case of a candidate for layout modification that is uniformly scaled down as illustrated in FIG. 13; none of the abovementioned evaluation scores are used, and the entire image is scaled down together until there is no more overlapping with the obstruction area. Regarding a user who does not want the relative position relationship between the objects to be disrupted even at the cost of a decline in the visibility caused by some degree of scaling down, there is a possibility that the pattern illustrated in FIG. 13 gets selected. Hence, the uniformly scaled-down candidate for layout modification is also considered as one of the choices.

As described above, in the first embodiment, the layout is modified depending on the evaluation scores related to visibility. With that, while giving a presentation using the projector 10; it becomes possible to project images in accordance with the intent of the user as much as possible. Hence, the information that the person who created the presentation wishes to communicate gets correctly conveyed than in the past.

Second Embodiment

Explained below is an example in which the writing area is large in size. As far as processing of a projected image is concerned, the explanation is identical to the flow of processes illustrated in FIG. 15.

Figure 28:
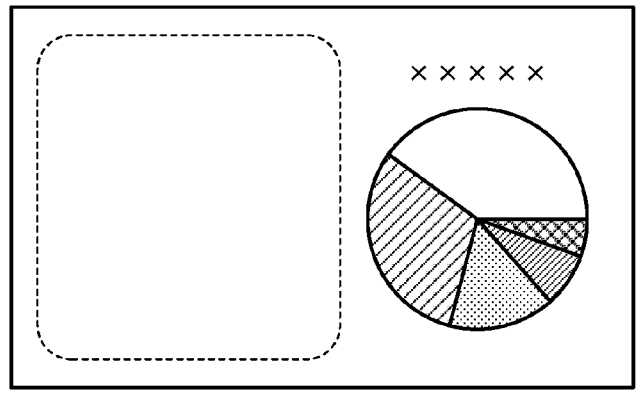
FIGS. 28 to 32 are diagrams for explaining examples when the writing area is large.
Figure 29:
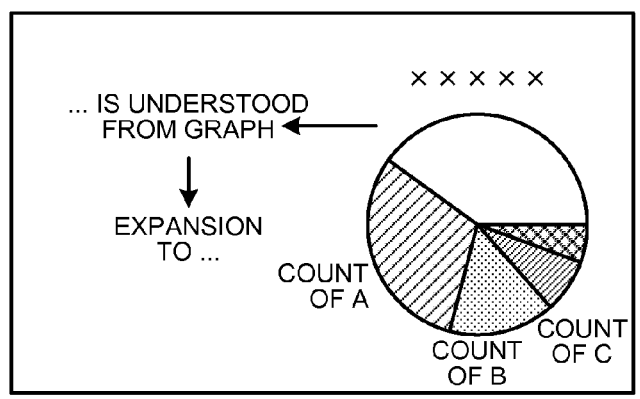
Figure 30:
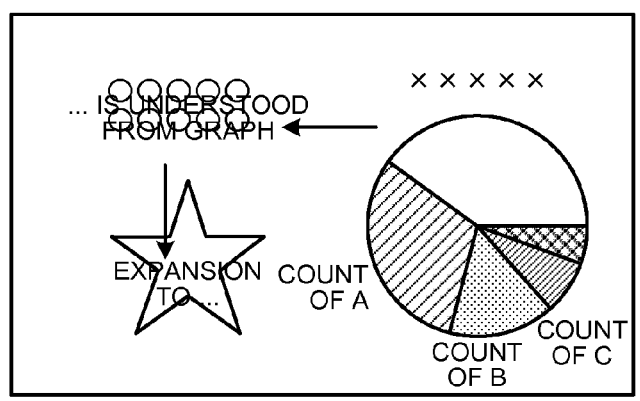
Figure 31:
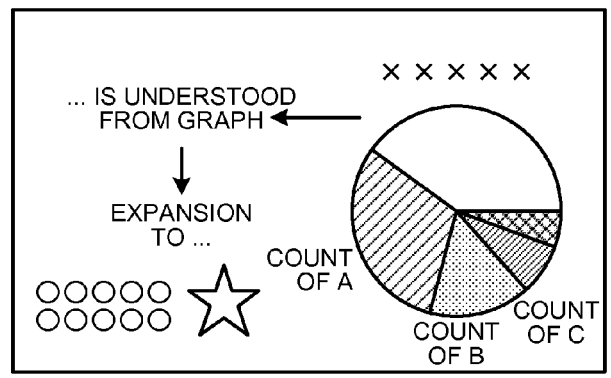

Consider a case when the discussions during a meeting result in an increase in the items that need be written on the whiteboard. In that case, as illustrated in FIG. 28, a large area enclosed by a dashed line is considered to be the writing area (and it is assumed that the projected image portion corresponding to the writing area is erased). Then, as illustrated in FIG. 29, assume that a character string and an arrow are written in that writing area. In that state, if a full-screen display is performed by not taking into account the writing area, then it results in a state illustrated in FIG. 30 in which the projected image and the written characters overlap. That leads to an extremely poor visibility. In that regard, in the present embodiment, the layout modifying unit 146 firstly scales down some of the objects and then modifies the layout as illustrated in FIG. 31.

Figure 32:
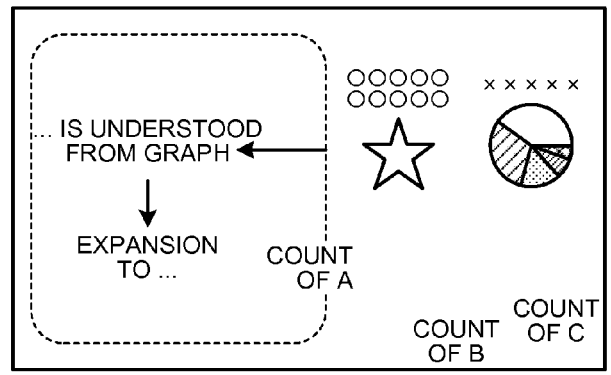

If an entirely scaled-down image is considered to be a candidate for layout modification; then, as illustrated in FIG. 32, the entire projected image is displayed in an extremely small size. Hence, this candidate for layout modification is less likely to be used. However, if the original image represents a single and an extremely large object, then this candidate for layout modification may be used. For that reason, this candidate for layout modification is also considered as one of the choices for the user.

Regarding the candidates for layout modification; (A) the amount of overlap between objects in the original image, (B) the amount of overlap between obstruction areas and objects, and (C) the movement distance of objects are considered as the evaluation items in an identical manner to the first embodiment. However, if the occupancy of the writing area in the projection surface is equal to or greater than a predetermined rate (for example, 50% of the projection surface); then the method of firstly scaling down some of the objects in the original image and then moving the objects is also taken into account. In that case, only the objects present in the writing area are scaled down. That is because the writing is likely done by taking into account the objects that are not to be scaled down. For example, as illustrated in FIG. 32, if the objects outside of the writing area are also scaled down, then it becomes difficult to maintain the consistency in the relative positional relationship between the objects and the written content. That may make it difficult to read the information. In contrast, in the second embodiment, only the objects present in the writing area are scaled down. With that, it becomes possible to avoid a situation in which the relative positional relationship between the objects and the written content is not maintained.

Regarding the objects present in the writing area; the layout modifying unit 146 compares the dimension of the background area other than the writing area with the dimension of those objects, and moves the objects after scaling them down to the extent of fitting them on a calculational basis.

The user can select a candidate for layout modification using the operation input unit 13. However, in case the selection of a candidate for layout modification is a burdensome task, then the user can be allowed to set the priority among the candidates based on the evaluation item (A), the candidates based on the evaluation item (B), and the entirely scaled-down display. Then, the display can be performed according to the priority.

Third Embodiment

Explained below is an example in which the layout is modified by taking into account the font colors and the background colors. As far as processing of a projected image is concerned, the explanation is identical to the flow of processes illustrated in FIG. 15. As compared to the first and second embodiments, the third embodiment differs in the method of selecting a candidate for layout modification.

Figure 33:
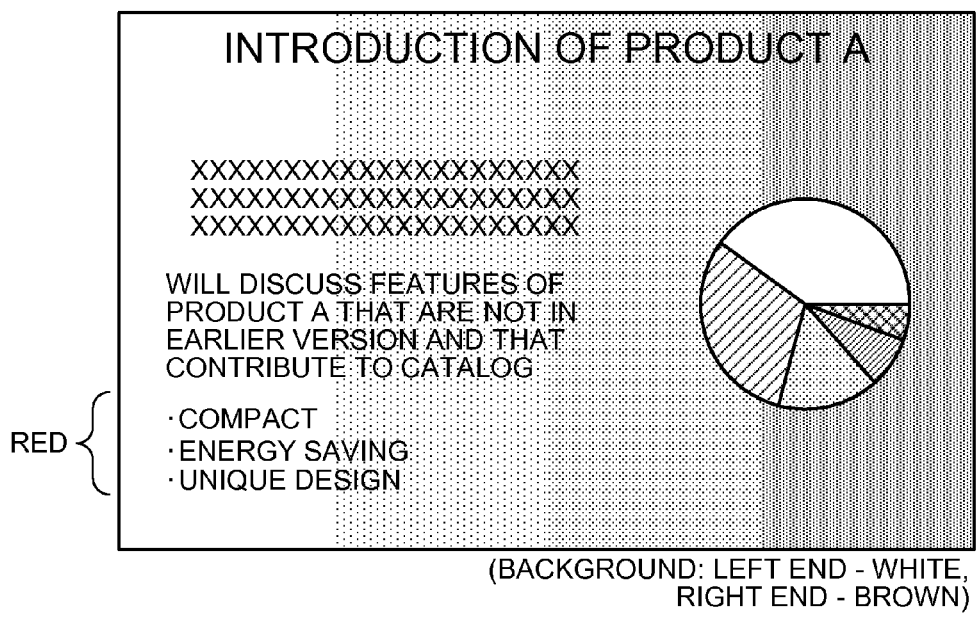
FIGS. 33 to 36 are diagrams for explaining an example of performing layout modification by taking into account font colors and background colors.
Figure 34:
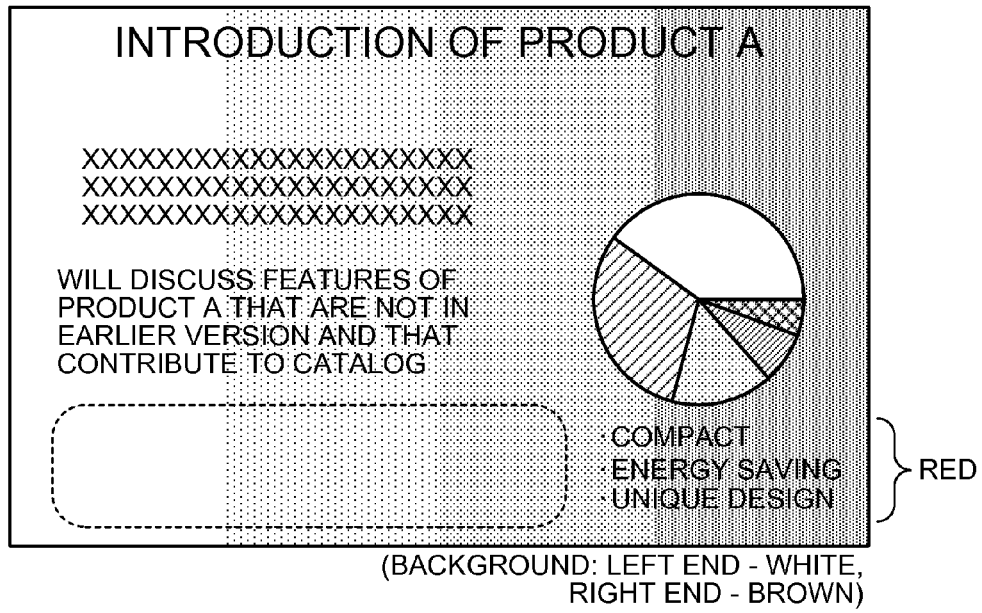

Consider a case in which, with respect to a presentation material (image) illustrated in FIG. 33, a writing area is created that is enclosed by a dashed line illustrated in FIG. 34. Moreover, it is assumed that the background in FIG. 33 (as well as in FIG. 34 to FIG. 36) has gradation starting from white color at the left end to brown color at the right end. Furthermore, it is assumed that character objects "● compact", "● energy-saving", and "● unique design" are written in red font. In this case, if layout modification is performed as explained in the first embodiment, then it results in the layout illustrated in FIG. 34. However, in FIG. 34, the objects that are moved happen to have a similar font color (red) to the background color (brown) on the right side. That leads to a substantial decline in visibility.

Figure 35:
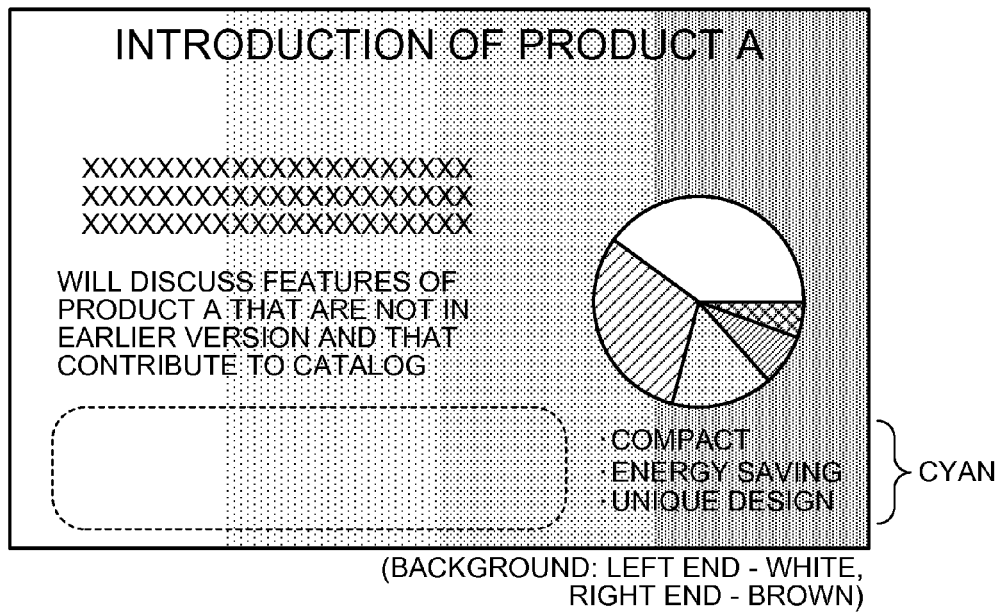

In FIG. 33, it is illustrated that the person who created the presentation is highlighting important character objects by setting red as the font color. However, in FIG. 34, the highlighted portion rather becomes less prominent. When the background color and the font color are close to each other, a technology is commonly known for displaying the character objects with a complementary color (herein, cyan) as illustrated in FIG. 35. However, that sometimes leads to a deviation from the idea of the person who created the presentation. For example, there can be a case when the font colors of characters themselves have some meaning in the presentation. If a presentation has red font defined to be related to a task A and has blue font defined to be related to a task B, then it is not desirable to have any changes in those colors. In essence, it is desirable that, while the hue of characters is maintained, the contrast is enhanced by means of having a brightness difference between the background colors and the font colors.

For that reason, when a target object for layout modification is a character object, the layout modifying unit 146 according to the third embodiment changes the color of that character object in such a way that there is an enhanced contrast between the color of the character object and the corresponding background color. Then, the layout modifying unit 146 changes the color of the character object with priority on changing the brightness.

Figure 36:
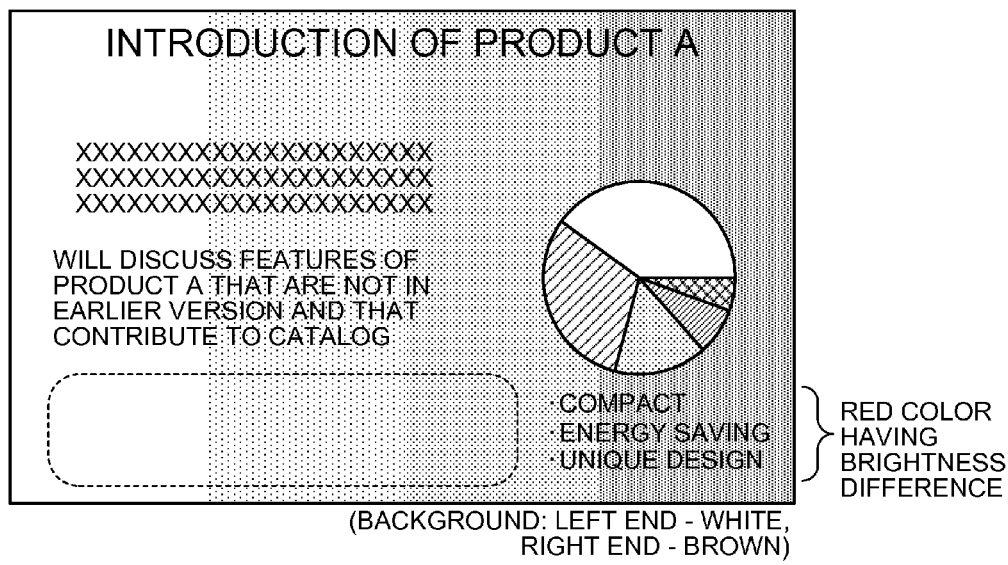

The result of such modification in the font color is illustrated in FIG. 36. Meanwhile, herein, a background color and a font color are thought to be close to each other if a color difference ΔE therebetween is equal to or smaller than eight (ΔE=8). However, that is not the only possible value of the color difference.

Regarding the candidates for layout modification, in the first embodiment, (A) the amount of overlap between objects in the original image; (B) the amount of overlap between obstruction areas and objects; and (C) the movement distance of objects are considered as the evaluation items. In comparison, in the third example, the evaluating unit 147 obtains the evaluation score additionally based on object color information and based on background color information in the original image data. More particularly, the evaluating unit 147 obtains the evaluation score by additionally using an evaluation item "color difference between background color and font color of moved character objects". Herein, since a background can have gradation as illustrated in FIG. 33, the average value within an area containing character objects is calculated as the background color.

Figure 37:
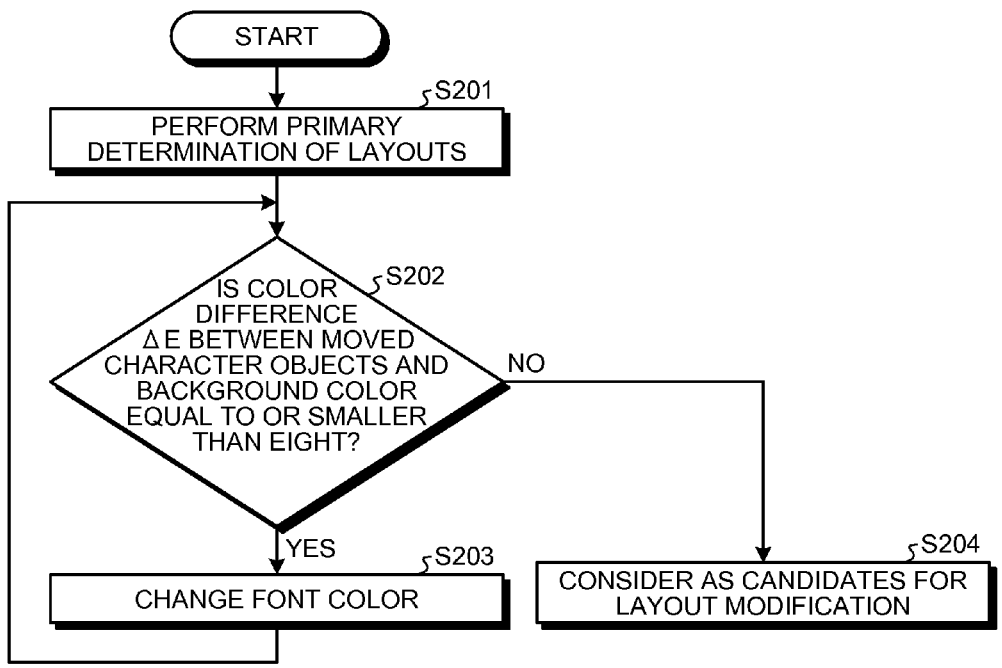
FIG. 37 illustrates a flowchart for deriving candidates for layout modification in a case when color difference is added as an evaluation item.

FIG. 37 illustrates a flowchart for deriving candidates for layout modification in a case when the abovementioned color difference is added as an evaluation item.

In primary determination of layouts performed at Step S201, candidates for layout modification are determined by following the method explained with reference to FIG. 1 and without taking into account the color difference (Step S201). Then, regarding the candidates for layout modification obtained by means of performing primary determination of layouts, the layout modifying unit 146 determines whether or not the color difference ΔE between the background color and the font color of the moved character objects is equal to or smaller than eight (Step S202). If the color difference ΔE is exceeding eight (No at Step S202), then the layout modifying unit 146 considers only those candidates for layout modification which have the color difference ΔE exceeding eight as the candidates for layout modification (Step S204). On the other hand, if the color difference ΔE is smaller than eight (Yes at Step S202), then the layout modifying unit 146 changes the font color (Step S203) and the system control returns to Step S202. Subsequently, if the color difference is sufficiently large (that is, if the color difference ΔE exceeds eight), then the layout modifying unit 146 considers only those candidates for layout modification which have the color difference ΔE exceeding eight as the candidates for layout modification (Step S204). As far as a change in the font color is concerned; as described above, a change in brightness is performed with priority. However, changing a font color with a complimentary color is also provided as a choice for the user.

Figure 38:
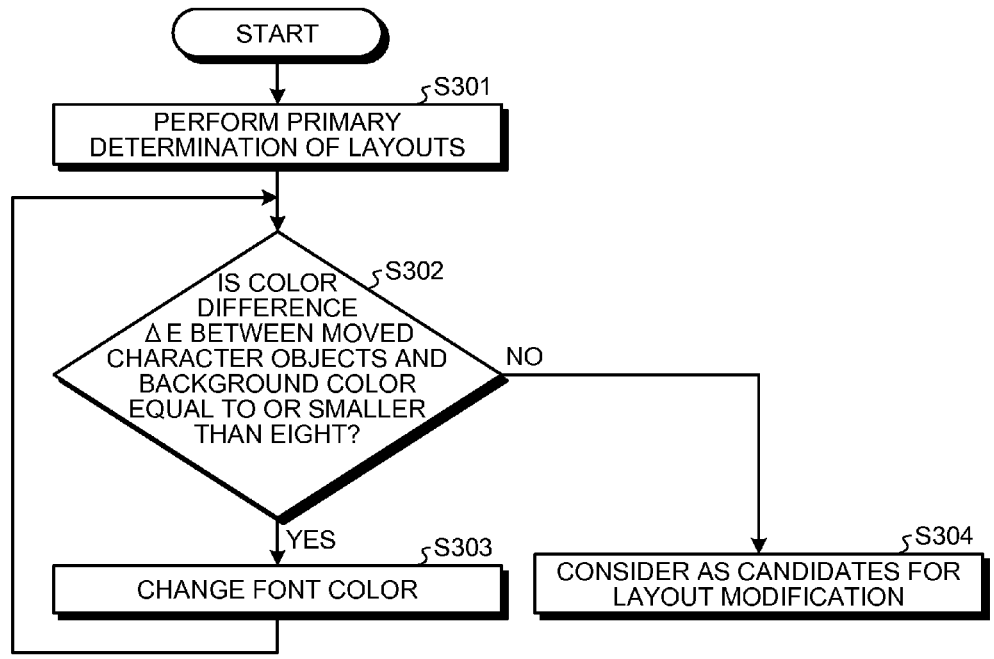
FIG. 38 illustrates a flowchart for deriving candidates for layout modification in a case when the reciprocal number of color difference is added as an evaluation item.

As a flowchart for deriving candidates for layout modification, it is also possible to employ a flowchart illustrated in FIG. 38. If the reciprocal number of the abovementioned color difference is considered as an evaluation item; then it is desirable that each of the evaluation items (A) to (C) as well as the reciprocal number of color difference is as small as possible. Thus, in the flowchart in FIG. 38, the evaluation items having a small total of evaluation scores is considered as an index for primary determination of layouts (Step S301). In FIG. 38, when the font color is changed (Step S303), the system control returns to Step 5301 and the evaluation items (the evaluation scores) are recalculated. Then, the layout modifying unit 146 performs primary determination of layouts. The processes from Step 5302 to Step 5304 are identical to the processes from Step 5202 to Step 5204 illustrated in FIG. 37. Thus, in an identical manner to the flowchart illustrate in FIG. 37, it is possible to determine the candidates for layout modification.

Herein, although the visibility is enhanced by changing the font color (with priority on changing the brightness), it is also possible to change the background color at the same time. In some cases, as illustrated in FIG. 33 in which the pie chart on the right side is clipped with a white frame, processing can also be done to clip an area containing character objects with a white frame.

As described above, in the third embodiment, the layout is modified by taking into account the font colors and the background colors. With that, it becomes possible to prevent a decline in the visibility of character objects that have been moved.

Fourth Embodiment

In a fourth embodiment, the explanation is given regarding an example in which, when the CUD mode is set in the projector 10, the font color is modified by taking into account the color universal design. In recent years, with the advent of color image output technology for displaying or printing color images, the documents created by individuals or business enterprises contain various colored characters or color images. In such documents, it is often the case that expressions for drawing attention or groupings of graphs are given in colored characters, thereby giving the colors the role of conveying important information. For that reason, in order to correctly comprehend the content of such documents, it is not only necessary to have the capability to recognize characters and images but also to have the capability to identify the differences in colors used in the documents.

The documents containing such various colors are useful in making it easier for a person having normal color vision to comprehend information. However, for a person having a defective color vision, that is not necessarily so. For example, there are people having a defective color vision which makes it difficult to distinguish between red and green. For a person having such a defective color vision, not only is it difficult to distinguish between red and green but it can be completely impossible to make that distinction.

Figure 39:
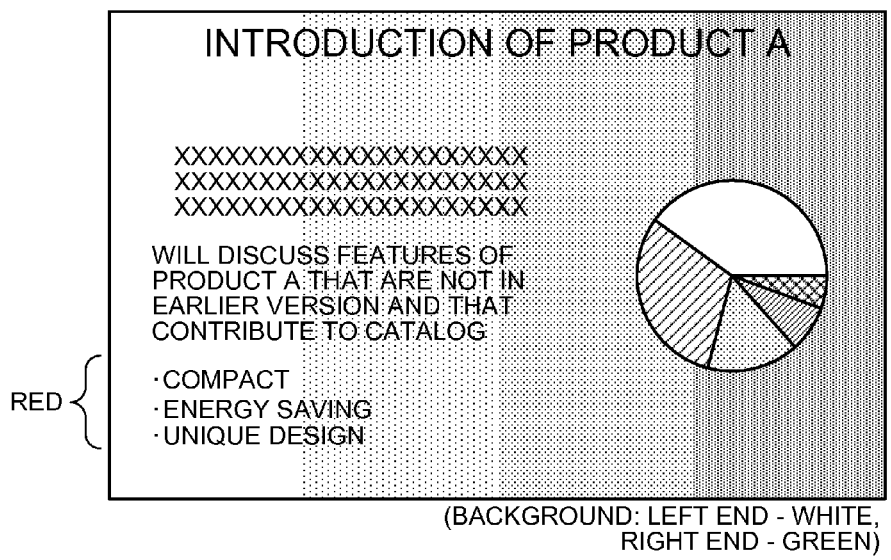
FIGS. 39 to 41 are diagrams for explaining changing of font colors in accordance with the color universal design (CUD)

Consider a presentation as illustrated in FIG. 39. Herein, it is assumed that the background in FIG. 39 (as well as in FIG. 40 and FIG. 41) has gradation starting from white color at the left end to green color at the right end. Moreover, it is assumed that character objects "● compact", "● energy-saving", and "● unique design" are written in red font. In this example, most of the left side in FIG. 39 is white in color. If characters are written in red font in that white area, then the characters are sufficiently recognizable even for a person having a defective color vision which makes it difficult to distinguish between red and green.

Figure 40:
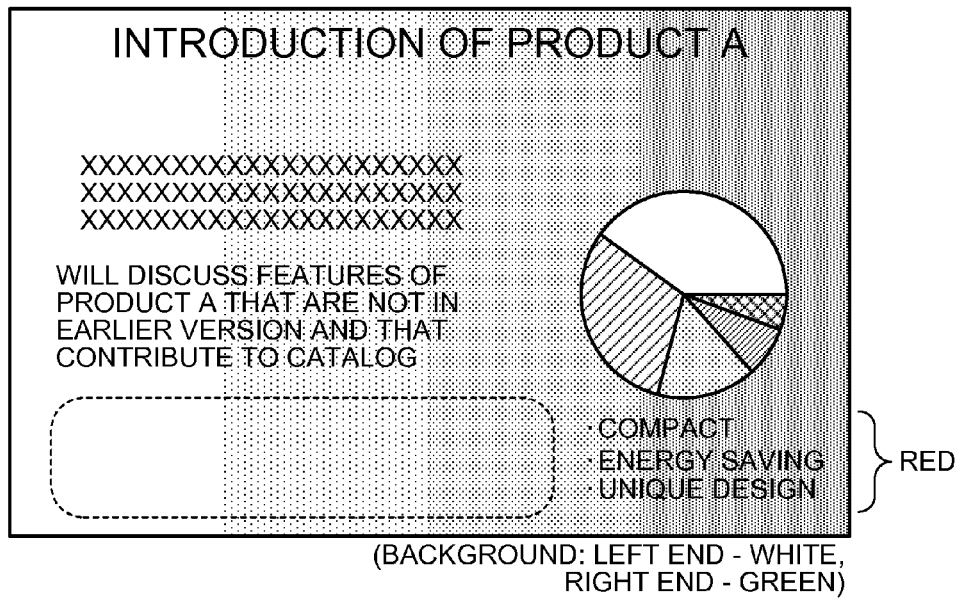
Figure 41:
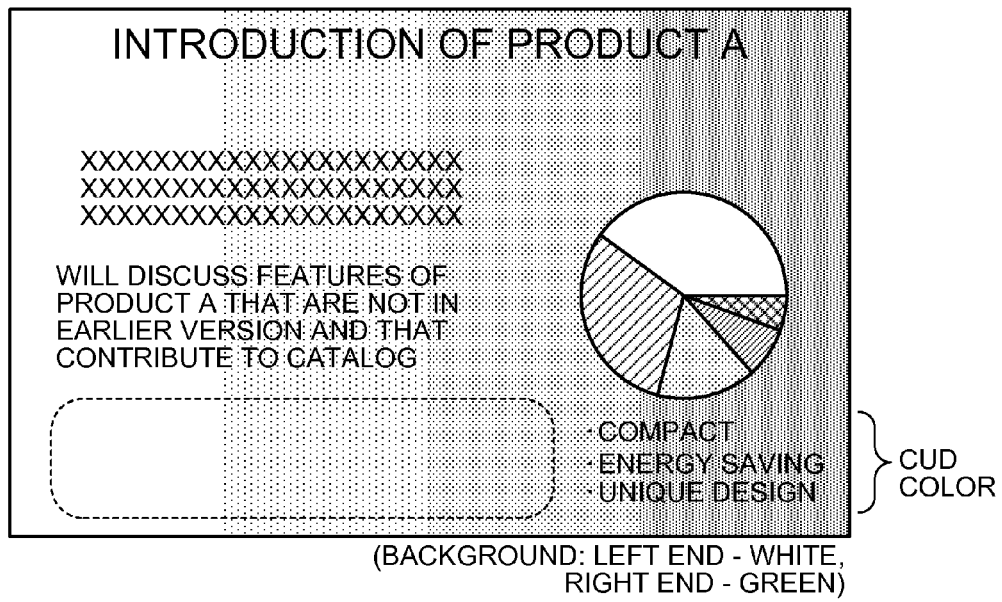

However, if a writing area is created as illustrated by a dashed line in FIG. 40 and if the layout is modified as illustrated in FIG. 40 (i.e., if the character string illustrated at bottom left in FIG. 39 is moved to bottom right), then the color difference between the background color and the character objects is sufficiently large so as to give no problem in visibility for a person having normal color vision. However, for people having a defective color vision which makes it difficult to distinguish between red and green, the visibility suffers from a considerable decline.

In that regard, when the CUD mode is set in the projector 10, the layout modifying unit 146 does not perform the color difference evaluation explained with reference to the flowchart illustrated in FIG. 37, and changes the colors with priority on sufficient visibility of characters for people having a defective color vision. Conventionally, a technology has been proposed to make it easier for users having a defective color vision to distinguish colors used in various documents (for example, Japanese Patent Application Laid-open No. 2010-268138). Herein, the layout modifying unit 146 changes the colors using such a technology. That results in a projected image illustrated in FIG. 41 in which the character strings in red color are changed to a CUD color that is recognizable even to the users having a defective color vision.

In the fourth embodiment, even for a person having a defective color vision, it becomes possible to prevent a decline in the visibility of character objects during layout modification.

Fifth Embodiment

FIGS. 42 and 43 illustrate examples of application in a presentation that has a plurality of continuous pages (in FIGS. 42 and 43, four pages from (a) to (d).

Generally, a presentation often contains a plurality of pages of display material. Besides, if a discussion held with respect to a particular page is referred to at the time of giving the further presentation, then the discussion may be advanced in a smooth manner. For example, if the objective of a presentation or the tentative schedule is discussed at the start of the presentation and if those details are written on the whiteboard; then it is thinkable that those details are referred to at a later point of time during the presentation. In such a case, the content written in the writing area needs to be continuously displayed throughout the presentation.

In FIG. 42 are illustrated original presentation images (original images); while in FIG. 43 are illustrated post-image-processing presentation images in which the writing area (the obstruction area) is continuously displayed. In this example, at the point of time of displaying the second page (b) of the presentation; a discussion is held regarding the objective and the schedule. Then, the discussion is held while referring to the images in the third page (c) and the fourth page (d). By performing such layout modification, it becomes possible to advance the discussion smoothly and without blocking the flow of the presentation. Meanwhile, the layout modification of original images is performed in an identical manner to that described in the earlier embodiments.

Meanwhile, the layout modification performed in this manner can be achieved by running a presentation development application in a PC and by manually rearranging all the objects. However, as explained in the first embodiment, that method is extremely complex and causes suspension of the meeting for a long period of time. That issue is particularly noticeable in a presentation having a large number of pages. In contrast, if the projector 10 according to the embodiment is used, then the discussion can be held smoothly without having to suspend the meeting too often. Besides, since the discussion can be held while referring to the necessary presentation material, it becomes easier to advance the discussion. Moreover, regarding the presentation material that is displayed, the visibility is maintained without considerably affecting the condition of the presentation material. Furthermore, the discussion can be held while keeping the necessary handwritten additional information displayed all the time.

Meanwhile, if performing settings for layout modification on a page-by-page basis in a presentation is a burdensome task for the user or causes interruption in the discussion; then the setting is so performed that the initially-set criterion is applied as it is throughout the presentation.

In the example illustrated in FIG. 43, the writing area specified at the time of projecting the second page (b) of the presentation is used as it is while projecting the third page (c) and the fourth page (d) of the presentation. However, that is not the only possible case. Alternatively, for example, at the time of projecting the third page (c) as well at the time of projecting as the fourth page (d) of the presentation, a writing area (an obstruction area) can be specified by comparing the image data for the image projection surface 40 obtained by the image capturing unit 11 with the original image data. As a result, each of the second page (b), the third page (c), and the fourth page (d) can have a different writing area.

Sixth Embodiment

In a sixth embodiment, the explanation is given for a case when the projector 10 according to the third embodiment is set to the energy saving mode.

In the energy saving mode, the current supplied to the illumination light source is restricted. That leads to a decrease in the light intensity as compared to the normal mode. As a result, the projection surface becomes dark in entirety and the dynamic range gets scarce. In such a case, it is difficult to have a brightness difference in projected images. Thus, while making changes in the colors, if it is not possible to have a sufficient difference in brightness due to the energy saving mode; then a change in chromaticity is allowed. Alternatively, the display can be performed using complementary colors with no exception. As a result, even in the energy saving mode, it becomes possible to prevent a decline in the visibility of character objects.

Seventh Embodiment

In the embodiments described above, the explanation is given with reference to handwritten characters or diagrams. However, as a matter of course, the same explanation is also applicable to physical obstructions as illustrated in FIG. 4. Regarding a case when the presentation needs to be given at a place where there are irremovable obstructions, it is equivalent to the fifth embodiment in which a writing area is present throughout the presentation. Hence, the objects are moved as may be necessary.

As described above, in the projector 10 according to the embodiment, the most suitable candidates for layout modification are derived from the amount of overlap between objects in the original image, the amount of overlap between obstruction areas and objects in the image data, and the movement distance of objects. Then, the user is allowed to determine whether or not to modify the layout if needed and to select the candidate for layout modification to be implemented. At the time of modifying the layout, the relative position relationship between the objects is modified. Thus, by using the projector 10 having such functions, the presentation can be projected with a high degree of visibility while ensuring that the handwritten characters, which are additionally written to deepen the discussion, and the original content of the presentation material are not much modified. Moreover, while giving a presentation using the projector 10, the information that the person who created the presentation wishes to communicate can be correctly conveyed to the audience.

Besides, the users are spared from the burdensome task of completely stopping the presentation, running the presentation development application, and again modifying the layout. As a result, it becomes possible to advance the discussion smoothly and without blocking the flow of the presentation.

Eighth Embodiment

In the first to seventh embodiments, the projector 10 compares the image data for the image projection surface 40 incorporated by the image capturing unit 11 with the source data, and identifies the difference therebetween as an obstruction area. In contrast, in the eighth embodiment, it is the user who specifies an obstruction area.

In the projector 10 according to the eighth embodiment, the internal configuration and the configuration of an image processing unit are identical to that explained in the first embodiment with reference to FIG. 2 and FIG. 3, respectively.

Figure 44:
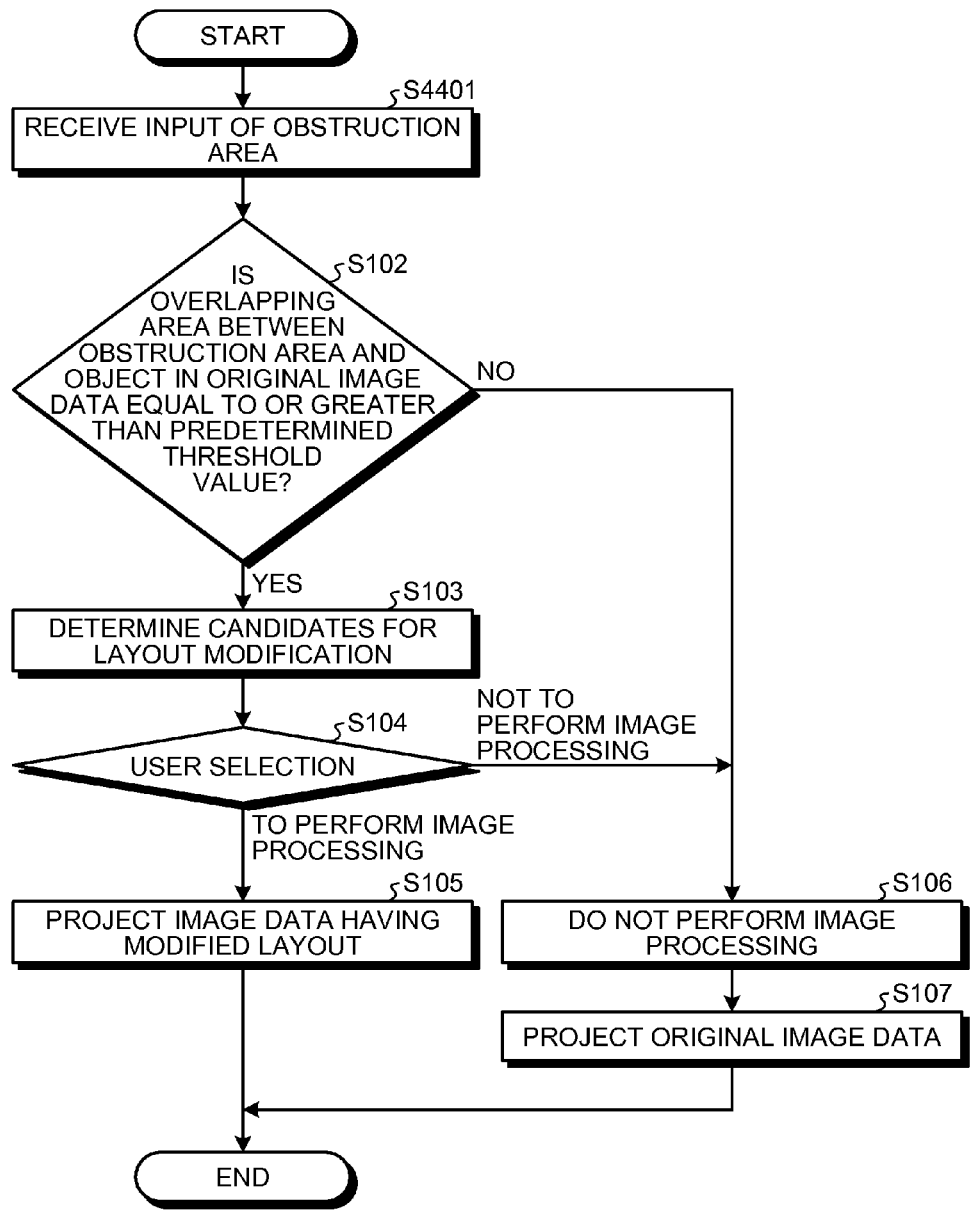
FIG. 44 is a flowchart for explaining a sequence of control processes performed in the projector according to an eighth embodiment.

FIG. 44 is a flowchart for explaining a sequence of control processes performed in the projector 10 according to the eighth embodiment. The user operates the operation input unit 13 and specifies an area on the image projection surface 40 that is to be considered as the obstruction area. The area can be specified by instructing the range covering that area or by inputting the coordinates of the range covering that area. Thus, the operation input unit 13 receives input of the obstruction area from the user (Step S4401). Then, the area identifying unit 144 identifies the range of the area that is input as the obstruction area. The subsequent processes are performed in an identical manner to the processes explained with reference to FIG. 15 in the first embodiment (i.e., in an identical manner to processes from Step 5102 to Step S107).

In this way, in the eighth embodiment, the user is allowed to specify the obstruction area. With that, while projecting the images, the information that the user wishes to communicate can be conveyed in a correct and flexible manner.

Ninth Embodiment

In the first to eighth embodiments, the image processing unit that identifies an obstruction area, that calculates evaluation scores, and that modifies the layout of objects is disposed inside the projector 10. In contrast, in a ninth embodiment, an external PC terminal that is connected to a projector via a network includes an image processing unit.

Figure 45:
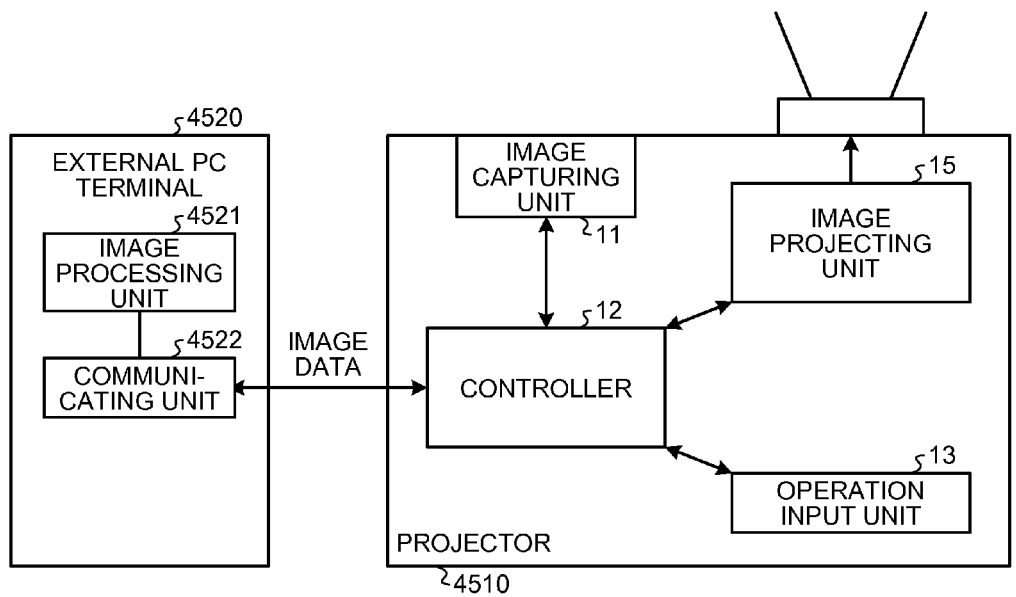
FIG. 45 is a block diagram illustrating configurations of a projector and an external PC terminal according to a ninth embodiment.

FIG. 45 is a block diagram illustrating configurations of a projector 4510 and an external PC terminal 4520 according to the ninth embodiment. Herein, in the ninth embodiment, the projector 4510 includes the image capturing unit 11, the controller 12, the image projecting unit 15, and the operation input unit 13. Moreover, the projector 4510 does not include an image processing unit. The image capturing unit 11, the image projecting unit 15, and the operation input unit 13 are identical to those explained in the first embodiment.

The controller 12 has the same functions as those explained in the first embodiment. In addition, the controller 12 sends the images captured by the image capturing unit 11 to the external PC terminal 4520 for the purpose of obstruction area identification, evaluation score calculation, and layout modification. Moreover, the controller 12 receives, from the external PC terminal 4520, the image data having been subjected to layout modification in the external PC terminal 4520; and then sends that image data to the image projecting unit 15.

The external PC terminal 4520 is connected to the projector 4510 via a network, and includes an image processing unit 4521 and a communicating unit 4522.

The communicating unit 4522 communicates image data with the controller 12 of the projector 4510.

The image processing unit 4521 identifies an obstruction area from the original image data and the captured images received from the projector 4510; calculates evaluation scores while moving the objects; and modifies the layout of the objects. The image processing unit 4521 has the same functions and the same configuration as the image processing unit 14 explained in the first embodiment. Thus, obstruction area identification, evaluation score calculation, and layout modification is performed in an identical manner to that explained in the first embodiment.

In this way, in the ninth embodiment, the image processing unit 4521 is disposed in the external PC terminal 4520 that is connected to the projector 4510 via a network. That makes it possible to reduce the processing load of the projector 4510.

According to the embodiments, the information that the user wishes to communicate using projected images can be correctly conveyed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image projecting apparatus, comprising:
    an image projector configured to project received original image data on an image projection surface;
    an area identifier configured to identify an obstruction area in which different content is displayed as compared to a normal projection surface to be projected based on the original image data;
    a layout modifier configured to modify a layout of an object included in the original image data that is projected, on the basis of the object and the obstruction area on the image projection surface; and
    an evaluator configured to obtain an evaluation value that indicates a relationship between a position of the object and the obstruction area in the original image data, wherein:
    the layout modifier modifies the layout so that the object is moved based on the obtained evaluation values,
    the layout modifier further modifies the layout of the object in the original image data on the basis of the evaluation value,
    the evaluator sets a plurality of different positions to which the object is movable in the original image data and obtains evaluation values for the respective positions of the object and
    the evaluator obtains the evaluation value also based on at least an amount of overlap between objects in the original image.

2. The apparatus according to claim 1, further comprising an operation input receiver configured to receive input from a user, wherein
    the layout modifier determines an image in which the object is moved to the position corresponding to the evaluation value that is within a predetermined range, as a candidate for layout modification,
    the image projector projects a plurality of candidates for layout modification that is determined on the image projection surface,
    the operation input receiver receives a user selection of a desired candidate for layout modification from the plurality of candidates for layout modification projected on the image projection surface, and
    the layout modifier modifies the layout so that the object is moved to the position indicated in the selected candidate for layout modification.

3. The apparatus according to claim 1, wherein the layout modifier obtains an amount of overlap between the obstruction area and the object in the original image data, and modifies the layout if the amount of overlap is equal to or greater than a predetermined threshold value.

4. The apparatus according to claim 1, further comprising an operation input receiver configured to receive input of the obstruction area from a user, wherein the area identifier identifies the received obstruction.

5. The apparatus according to claim 1, further comprising an image capturing sensor configured to capture an image being projected on the image projection surface, wherein the area identifier identifies the obstruction area in which different content is displayed as compared to a normal projection surface to be projected based on the original image data, on the basis of image data obtained by the image capturing sensor and the original image data.

6. The apparatus according to claim 1, wherein the evaluator obtains the evaluation value on the basis of color information of the object and color information of a background in the original image data.

7. The apparatus according to claim 6, wherein, when a target object for layout modification is a character object, the layout modifier changes a color of the character object so that a contrast between the color of the character object and a color of the background is enhanced.

8. The apparatus according to claim 7, wherein the layout modifier changes a brightness of the character object as a priority in changing the color of the character object.

9. The apparatus according to claim 1, wherein, when an occupancy of the obstruction area in the area of the image projection surface is equal to or greater than a predetermined rate, the layout modifier changes a size of at least one object included in the original image data.

10. The apparatus according to claim 9, wherein the layout modifier changes the size of the object included in the obstruction area.

11. The apparatus according to claim 1, wherein, in a mode in which image data is subjected to color processing intended for partially color-blind people, the layout modifier performs color adjustment to colors having enhanced color distinctiveness for partially color-blind people as a priority.

12. The apparatus according to claim 1, wherein the layout modifier changes a color of at least one object included in the original image data and a background color in layout modification.

13. An image projecting apparatus, comprising:
an image projector configured to project received original image data on an image projection surface;
an area identifier configured to identify an obstruction area in which different content is displayed as compared to a normal projection surface to be projected based on the original image data;
a layout modifier configured to modify a layout of an object included in the original image data that is projected, on the basis of the object and the obstruction area on the image projection surface; and
an evaluator configured to obtain an evaluation value that indicates a relationship between a position of the object and the obstruction area in the original image data, wherein:
the layout modifier modifies the layout so that the object is moved based on the obtained evaluation values,
the layout modifier further modifies the layout of the object in the original image data on the basis of the evaluation value,
the evaluator sets a plurality of different positions to which the object is movable in the original image data and obtains evaluation values for the respective positions of the object,
the evaluator obtains the evaluation value based on at least one of an amount of overlap between the obstruction area and the object, an amount of overlap between objects in the original image, and a movement distance of the object in layout modification, and
the evaluator obtains, as the evaluation value, a sum of a first evaluation value determined based on an amount of overlap between the obstruction area and the object, a second evaluation value determined based on an amount of overlap between the objects in the original image, and a third evaluation value determined based on a movement distance of the object in layout modification.

14. An image projecting apparatus, comprising:
an image projector configured to project received original image data on an image projection surface;
an area identifier configured to identify an obstruction area in which different content is displayed as compared to a normal projection surface to be projected based on the original image data;
a layout modifier configured to modify a layout of an object included in original image data that is projected, on the basis of the object and the obstruction area on the image projection surface; and
an evaluator configured to obtain an evaluation value that indicates a relationship between a position of the object and the obstruction area in the original image data, wherein:
the layout modifier modifies the layout so that the object is moved based on the obtained evaluation values,
the layout modifier further modifies the layout of the object in the original image data on the basis of the evaluation value,
the evaluator sets a plurality of different positions to which the object is movable in the original image data and obtains evaluation values for the respective positions of the object,
the evaluator obtains the evaluation value based on at least one of an amount of overlap between the obstruction area and the object, an amount of overlap between objects in the original image, and a movement distance of the object in layout modification, and
the evaluator obtains, as the evaluation value, a weighted sum of a first evaluation value determined based on an amount of overlap between the obstruction area and the object, a second evaluation value determined based on an amount of overlap between the objects in the original image, and a third evaluation value determined based on a movement distance of the object in layout modification.

* * * * *